(12) United States Patent
Mizuno et al.

(10) Patent No.: US 8,251,420 B2
(45) Date of Patent: Aug. 28, 2012

(54) JOINT MECHANISM AND JOINT DEVICE

(75) Inventors: Osamu Mizuno, Osaka (JP); Akinobu Okuda, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/397,212

(22) Filed: Feb. 15, 2012

(65) Prior Publication Data
US 2012/0137807 A1    Jun. 7, 2012

Related U.S. Application Data

(62) Division of application No. 12/517,710, filed as application No. PCT/JP2007/073671 on Dec. 7, 2007, now Pat. No. 8,141,925.

(30) Foreign Application Priority Data
Dec. 7, 2006 (JP) .................. 2006-330629

(51) Int. Cl.
*B66C 1/00* (2006.01)
(52) U.S. Cl. ........................................ 294/106
(58) Field of Classification Search .................. 294/198, 294/106; 901/38; 623/64
See application file for complete search history.

(56) References Cited

U.S. PATENT DOCUMENTS

| 4,364,593 A | 12/1982 | Maeda |
| 4,547,121 A | 10/1985 | Nesmith |
| 4,828,276 A | 5/1989 | Link et al. |
| 4,957,320 A | 9/1990 | Ulrich |
| 5,501,498 A | 3/1996 | Ulrich |
| 5,888,246 A | 3/1999 | Gow |

FOREIGN PATENT DOCUMENTS

| JP | 1-58851 | 4/1989 |
| JP | 1-140984 | 6/1989 |
| JP | 3-11535 | 2/1991 |
| JP | 5-185385 | 7/1993 |
| JP | 6-305455 | 11/1994 |
| JP | 9-510128 | 10/1997 |
| JP | 11-156778 | 6/1999 |
| JP | 2001-38669 | 2/2001 |
| WO | 2004/028753 | 4/2004 |

OTHER PUBLICATIONS

International Search Report issued Mar. 4, 2008 in the International (PCT) Application No. PCT/JP2007/073671.
Supplementary European Search Report issued Jan. 28, 2010 in Application No. EP 07 85 9749.

*Primary Examiner* — Dean Kramer
*Assistant Examiner* — Stephen Vu
(74) *Attorney, Agent, or Firm* — Wenderoth, Lind & Ponack, L.L.P.

(57) ABSTRACT

The joint mechanism includes a first link, a second link, a third link, a shaft supported on the second link to be rotatable about an axis thereof, and movable in an axis direction thereof, a first worm and a second worm mounted on the shaft, a first worm wheel in mesh with the first worm to pivotally move the first link with respect to the second link, and a second worm wheel in mesh with the second worm to pivotally move the third link with respect to the second link. The first link and the third link are pivotally moved in opposite directions to each other by rotating the shaft, and pivotally moved in identical directions to each other by moving the shaft in the axis direction.

6 Claims, 22 Drawing Sheets

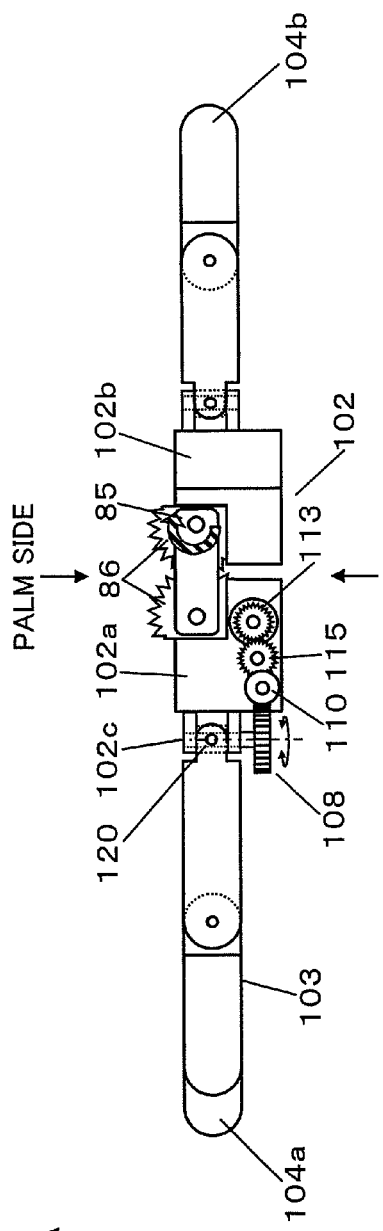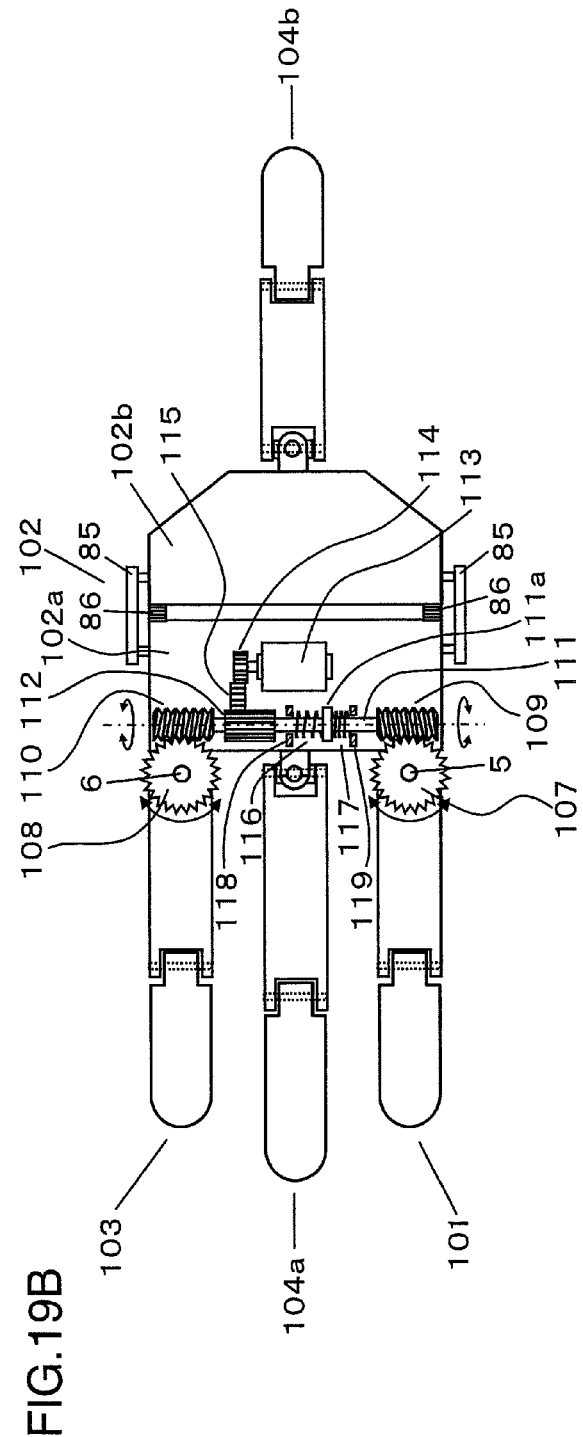
FIG.19A
FIG.19B

JOINT MECHANISM AND JOINT DEVICE

This application is a Divisional of U.S. application Ser. No. 12/517,710, file Jun. 4, 2009, now U.S. Pat. No. 8,141,925, which is a National Stage Application of International Application No. PCT/JP2007/073671, filed Dec. 7, 2007.

TECHNICAL FIELD

The present invention relates to a joint mechanism, and more particularly relates to a joint mechanism and a joint device primarily for use in a robotic manipulator.

BACKGROUND ART

In recent years, shortage of manpower resulting from a declining birthrate and an aging population, as well as an increase in aging population are concerned, and development of industrial/home-use robots for compensating for these problems is expected. In particular, it is essential and important that robots have a gripping mechanism capable of gripping a variety of kinds of articles, and a joint mechanism capable of setting an intended posture to do a complicated work. Application of the gripping mechanism to a prosthetic hand for persons with hand disabilities has also been investigated in various ways.

In view of the above circumstances, some finger mechanisms for gripping an article have been proposed. FIG. 21 shows an example, wherein a finger gripping mechanism incorporated with a worm and a worm wheel is used as a prosthetic hand (see e.g. patent document 1).

Specifically, a worm wheel 93 is rotated by a worm 92 mounted at a lead end of a motor 91. Thereby, links 94 and 95 serving as a gripping finger are pivotally moved in e.g. a gripping direction. Even if a force to open up the link 95 is exerted on the link 95, there is no likelihood that the worm wheel 93 may be rotated in backward direction because of engagement with the worm 92. In this arrangement, the gripping mechanism is allowed to keep holding an article.

FIG. 22 shows an example of a finger of a gripping mechanism having an increased degree of freedom by using multiple motors (see e.g. patent document 2). In the gripping mechanism, four motors 96 through 99 are used to obtain four degrees of freedom.

Patent document 1: JP (tokuhyo) Hei 9-510128
Patent document 2: JP Hei 11-156778

The conventional gripping mechanism has the following problem. For instance, in the gripping mechanism shown in FIG. 21, since the degree of freedom is one, it is difficult to grip articles of various shapes. For instance, the link 95 serving as a finger does not fit an article of a flat plate-like shape. Accordingly, the gripping mechanism is incapable of gripping the article with a proper frictional force. In other words, in the joint mechanism shown in FIG. 21, the link 95 serving as a finger is not set in an intended posture.

On the other hand, the gripping mechanism shown in FIG. 22 has a sufficient degree of freedom for a gripping operation. However, since the number of the motors in the gripping mechanism is increased, the production cost may be increased. In other words, in the joint mechanism shown in FIG. 22, the number of drive sources may be increased, although an intended posture is obtained.

SUMMARY OF THE INVENTION

It is an object of the present invention to solve the above problem. It is another object of the present invention to realize a joint mechanism capable of setting any intended postures with a simplified arrangement.

A joint mechanism according to an aspect of the invention includes: a first link; a second link pivotally linked to the first link; a third link pivotally linked to the second link; a connecting member supported on the second link; a first worm and a second worm coupled to each other by the connecting member, the first worm and the second worm each being rotatable about its axis and movable in an axis direction thereof; a first worm wheel in mesh with the first worm to pivotally move the first link with respect to the second link; and a second worm wheel in mesh with the second worm to pivotally move the third link with respect to the second link, wherein the joint mechanism satisfies a relation: $dA \times dB \geqq 0$ by rotation of the first worm and the second worm, and the joint mechanism satisfies a relation: $dA \times dB \leqq 0$ by movement of the first worm and the second worm in the axis direction, where A is an angle defined by the first link and the second link, B is an angle defined by the second link and the third link, dA is a change amount of the angle A, and dB is a change amount of the angle B.

BRIEF DESCRIPTION OF THE DRAWINGS

FIGS. 19A and 19B are diagrams showing a construction of a joint mechanism in accordance with the eleventh embodiment of the invention.

DETAILED DESCRIPTION OF THE PREFERRED EMBODIMENTS OF THE INVENTION

Figure 1A:
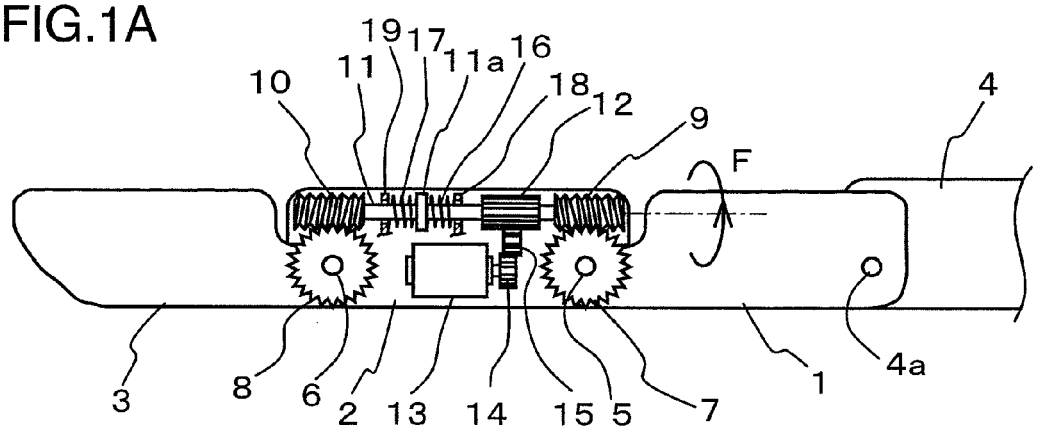
FIGS. 1A through 1C are diagrams showing a construction of a joint mechanism in accordance with the first embodiment of the invention.

In the following, a best mode for carrying out the invention is described in detail referring to the drawings.

First Embodiment

FIGS. 1A through 4C are diagrams showing a joint mechanism embodying the present invention. The joint mechanism of this embodiment is constituted as a gripping mechanism capable of gripping an article. As shown in FIG. 1A, the gripping mechanism includes a first link 1 as a gripping finger, a second link 2 as a gripping finger, and a third link 3 as a gripping finger. The first link 1 and the second link 2 are pivotally linked to each other about a pivot pin 5. The second link 2 and the third link 3 are pivotally linked to each other about a pivot pin 6. The first link 1 is constructed to be connectable to a palm member 4 via a pivot pin 4a. The pivot pins 5 and 6 are each fixed to the second link 2. The pivot pin 5 and the pivot pin 6 are provided at longitudinal both ends of the second link 2 in parallel to each other. A distal end of the first link 1 is linked to a base end of the second link 2 via the pivot pin 5, and a distal end of the second link 2 is linked to a base end of the third link 3 via the pivot pin 6.

The gripping mechanism includes two worm wheels 7 and 8. The worm wheels 7 and 8 are mounted on the pivot pins 5 and 6, respectively. The worm wheel 7 is pivotally movable about the pivot pin 5, and the worm wheel 8 is pivotally movable about the pivot pin 6. The worm wheel 7 is fixed to one end of the first link 1, and the worm wheel 8 is fixed to one end of the third link 3. In this construction, the first link 1 is integrally rotatable with the worm wheel 7, and the third link 3 is integrally rotatable with the worm wheel 8. Alternatively, the worm wheel 7 may be integrally formed with the first link 1, and the worm wheel 8 may be integrally formed with the third link 3.

The worm wheel 7 is meshed with a worm 9, and the worm wheel 8 is meshed with a worm 10. The worm 9 and the worm 10 are rigidly fixed to a shaft 11, as an example of a connecting member, and are disposed away from each other by a certain distance. The worms 9 and 10 are interconnected to each other via the shaft 11. The worm 9 is a so-called right hand screw, and the worm 10 is a so-called left hand screw. In other words, the worms 9 and 10 have helical grooves in opposite directions to each other.

A module constituted of the worm wheel 7 and the worm 9, and a module constituted of the worm wheel 8 and the worm 10 are identical to each other in construction, and the number of teeth and the diameter of the modules are identical to each other.

A flange 11a is provided at an intermediate portion of the shaft 11 between the worms 9 and 10. A gear 12 is rigidly mounted on the intermediate portion of the shaft 11. The shaft 11 is supported by a pair of support walls 18 and 19 formed on the second link 2, and extends in the longitudinal direction of the second link 2. The support walls 18 and 19 are respectively formed with through-holes, and the shaft 11 is held through the through-holes in such a manner that the flange 11a is disposed between the support walls 18 and 19. In this construction, the shaft 11 is rotatable about an axis thereof, and is movable along a translational direction corresponding to an axis direction thereof.

A spring 16 is mounted between the support wall 18 and the flange 11a, and a spring 17 is mounted between the support wall 19 and the flange 11a, with residual compressive restoring forces of the springs 16 and 17 being retained, respectively. The flange 11a, the springs 16 and 17, and the support walls 18 and 19 constitute centering means 20 for the worms 9 and 10.

A motor 13 as a drive source is loaded on the second link 2. A gear 14 is mounted on a distal end of a drive shaft of the motor 13. The motor 13 is arranged on the side of the worm wheels 7 and 8 with respect to the shaft 11, and in a space defined by the worm wheels 7 and 8. In other words, since the motor 13 is installed in the space, the space can be efficiently utilized, and the gripping mechanism can be constructed with smaller dimensions. A gear 15 is mounted between the gear 14, and a gear 12 mounted on the shaft 11. The driving force of the motor 13 is transmitted to the shaft 11 via the gear 14, the gear 15, and the gear 12. The gear 15 is only allowed to rotate about an axis thereof. But the gear 12 extends in the axis direction of the shaft 11 so that engagement of the gear 12 with the gear 15 is maintained, even if the shaft 11 moves in the translational direction.

An operation to be performed by the gripping mechanism having the above construction is described in the following.

Let it be assumed that the first link 1, the second link 2, and the third link 3 are set in a state shown in FIG. 1A, as an initial state. When the motor 13 is driven in this state, the gear 14, the gear 15, and the gear 12 are respectively rotated, and the shaft 11 is rotated in e.g. F direction shown in FIG. 1A. In this state, since the gear 12 and the worms 9 and 10 are rigidly connected to the shaft 11, both of the worms 9 and 10 are rotated in F direction.

Figure 1B:
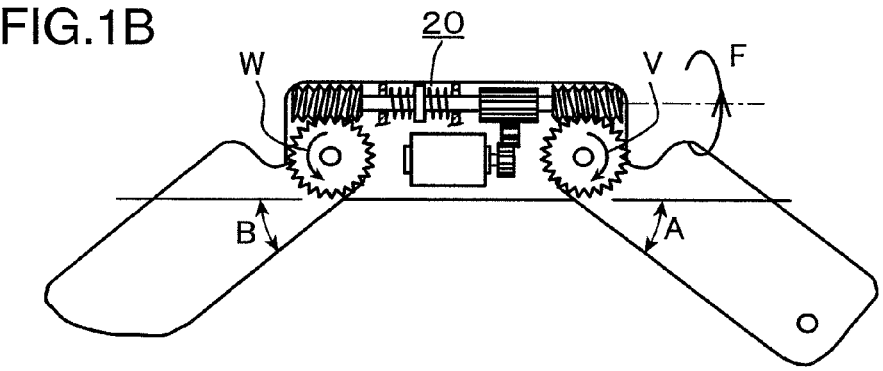
Figure 1C:
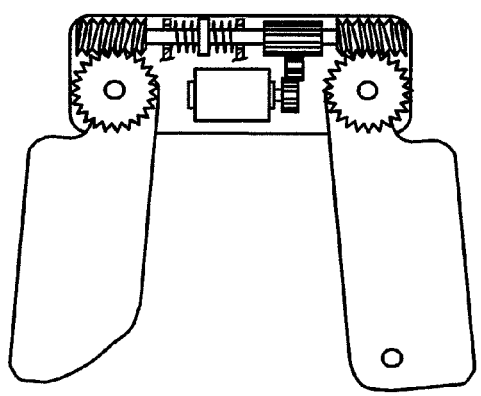

Observing the above operation from the viewpoint of the second link 2, the worm wheel 7 starts rotating in V direction in FIG. 1B by rotation of the worm 9, thereby rotating the first link 1 connected to the worm wheel 7 in V direction. Similarly, the third link 3 is rotated in W direction in FIG. 1B by rotation of the worm 10. Let it be assumed that, in the case where the shaft 11 is rotated by a certain rotation angle, the angle defined by the first link 1 and the second link 2 is set to the angle "A", and the angle defined by the second link and the third link is set to the angle "B". The shaft 11 is then further rotated until the angle "A" and the angle "B" are respectively set to about 90 degrees, as shown in FIG. 1C.

By performing the above series of operations, both of the change amount dA of the angle "A", and the change amount dB of the angle "B" by rotation of the shaft 11 are increased. On the other hand, if the shaft 11 is rotated in the backward direction, both of the change amount dA and the change amount dB are decreased. In other words, a relation: dA×dB≧0 is established. While the above series of operations are performed, as far as transmission torques at both ends of the shaft 11 are balanced to each other, the shaft 11 is rotated about the axis thereof, without moving in the axis direction thereof.

If the torques of the worms 9 and 10 for rotating the worm wheels 7 and 8 are temporarily unbalanced, the spring 16, 17 may be expanded or contracted, with the result that the shaft 11 may be moved in the axis direction thereof. However, since the centering means 20 is operable to constantly return the shaft 11 to a neutral position, the positions of the first link 1 and the third link 3 are stabilized.

Figure 2A:
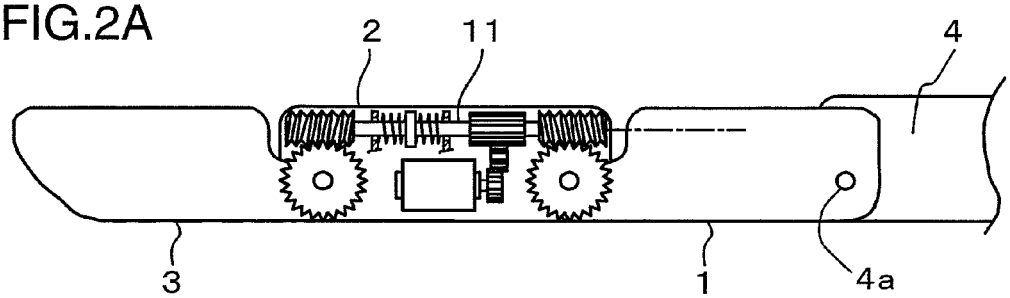
FIGS. 2A through 2C are diagrams for describing a series of movements of the joint mechanism in accordance with the first embodiment of the invention, in the case a shaft is rotated, with a first link being fixed.
Figure 2B:
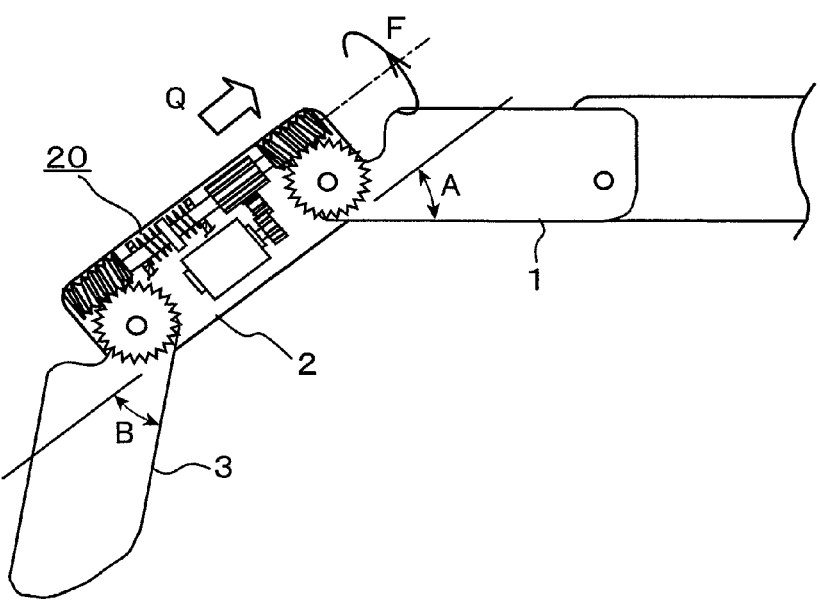
Figure 2C:
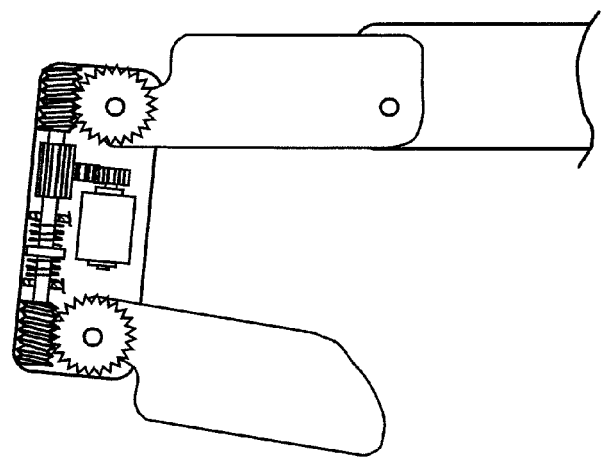

Next, FIGS. 2A through 2C show a series of movements of the first through the third links 1 through 3, letting it be assumed that the palm member 4 is defined as a stationary system. Referring to FIG. 2B, assuming that the downward direction on the plane of FIG. 2B corresponds to the gravitational direction, a gravitational force acts in such a direction as to pivotally move the second link 2 counterclockwise. Thereby, the shaft 11 is translationally moved in Q direction with respect to the second link 2, with the result that the angle "A" is increased, and the angle "B" is decreased. The centering means 20 has a function of canceling the action of the gravitational force and maintaining the posture of the gripping mechanism. The centering means 20 also has substantially the same function as described above with respect to disturbance such as vibrations.

Figure 3A:
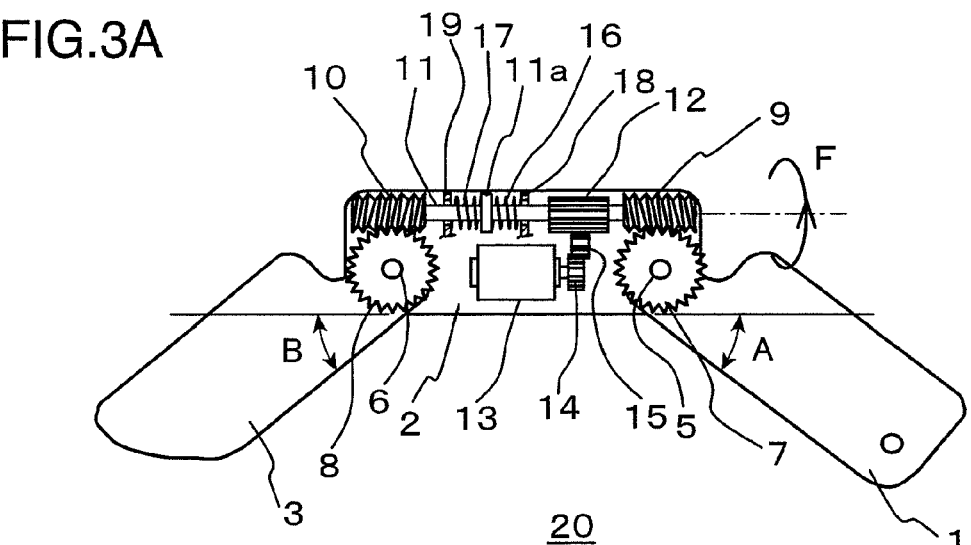
FIGS. 3A through 3C are diagrams for describing a series of movements of the joint mechanism in accordance with the first embodiment of the invention, in the case where an article to be gripped is in a displaced position.
Figure 3B:
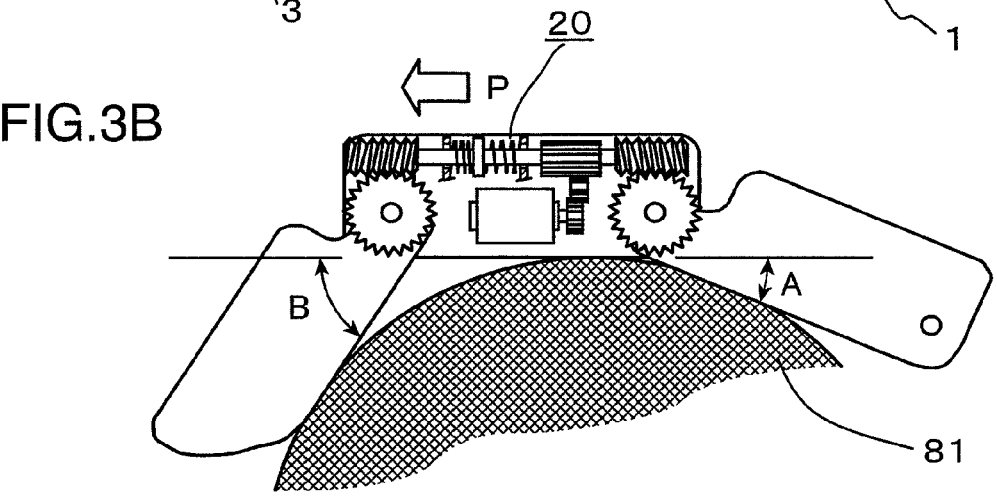
Figure 3C:
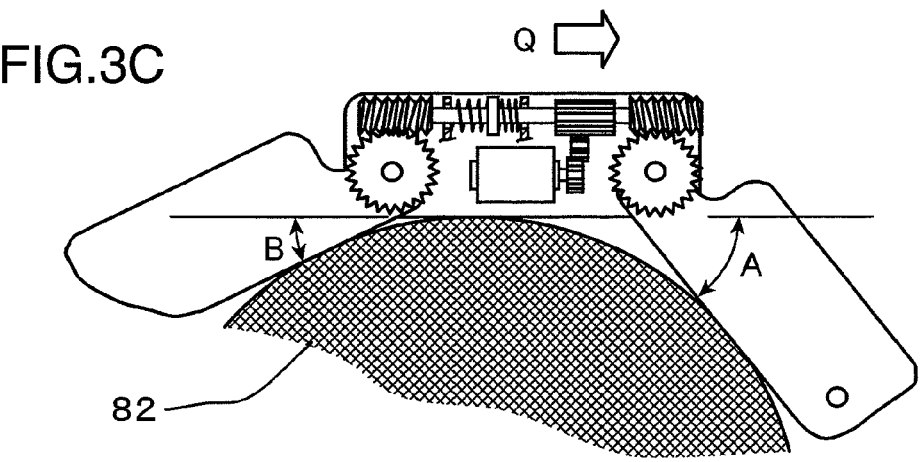

FIGS. 3A through 3C are diagrams showing operation states of the gripping mechanism, in the case where an article is to be gripped by the gripping mechanism. FIG. 3A shows substantially the same state as shown in FIG. 1B, wherein the angle "A" nearly equals the angle "B". Now, let it be assumed that as shown in FIG. 3B, an article 81 near the first link 1 is to be gripped. Since the first link 1 is pressed against the article 81, the first link 1 starts pivotally moving about the pivot pin 5 in such a direction as to decrease the angle "A". Thereby, a translational force is transmitted to the shaft 11 via the worm wheel 7 and the worm 9, and the shaft 11 is moved in P direction against a force of the spring 17 of the centering means 20. Thereby, a rotational driving force is transmitted to the third link 3 via the worm 10 and the worm wheel 8, with the result that the third link 3 is rotated in such a direction as to increase the angle "B". Then, the shaft 11 is moved until the unbalance between the torques to be applied to the first link 1 and the third link 3 is eliminated. In this way, even in the case where there is an unbalance between the torques, the unbalance can be eliminated by translationally moving of the worms 9 and 10 in the axis direction. Thus, the gripping mechanism is allowed to automatically adjust to the shape of the article 81 as an object to be gripped. In performing the above operation, the change amounts of the angles "A" and "B" by translational movement of the shaft 11 are: dA≦0, dB≧0. In other words, a relation dA×dB≦0 is established concerning the change amounts dA and dB of the angles "A" and "B" by translational movement of the shaft 11.

As shown in FIG. 3C, the worms 9 and 10 interconnected to each other by the shaft 11 are translationally moved in Q direction with respect to an article 82 near the third link 3. Then, a gripping operation is performed while securing a balance in the similar manner as described above. In performing the above operation, the change amounts dA and dB of the angles "A" and "B" by translational movement of the shaft 11 are dA≧0 and dB≦0. In other words, a relation dA×dB≦0 is established concerning the change amounts dA and dB of the angles "A" and "B" by translational movement of the shaft 11.

The gear 12 extends in the axis direction of the shaft 11. Accordingly, as shown in FIGS. 3B and 3C, an engagement state between the gear 12 and the gear 15 is maintained, even if the shaft 11 is translationally moved in the axis direction.

Figure 4A:
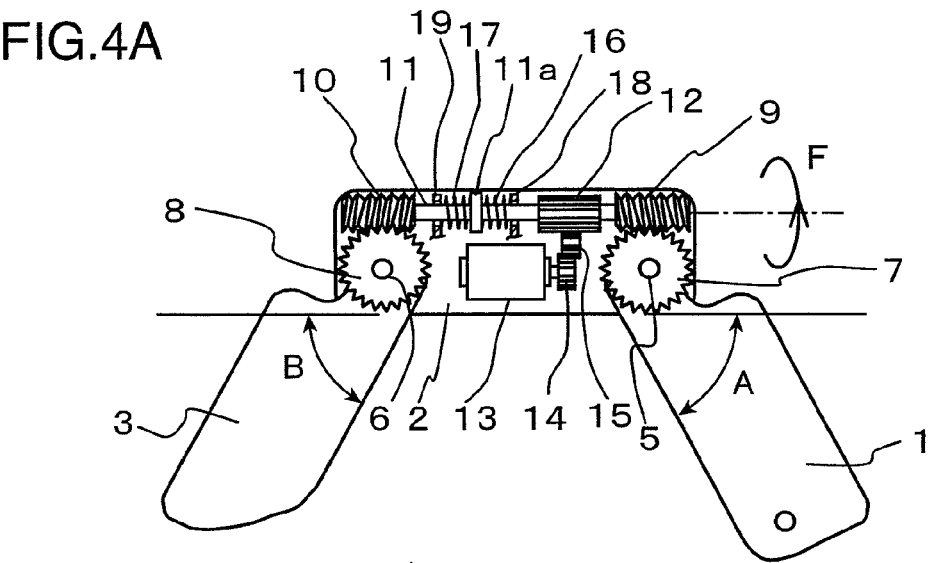
FIGS. 4A through 4C are diagrams for describing a series of movements of the joint mechanism in accordance with the first embodiment of the invention, in the case where a small-sized article is to be gripped.
Figure 4B:
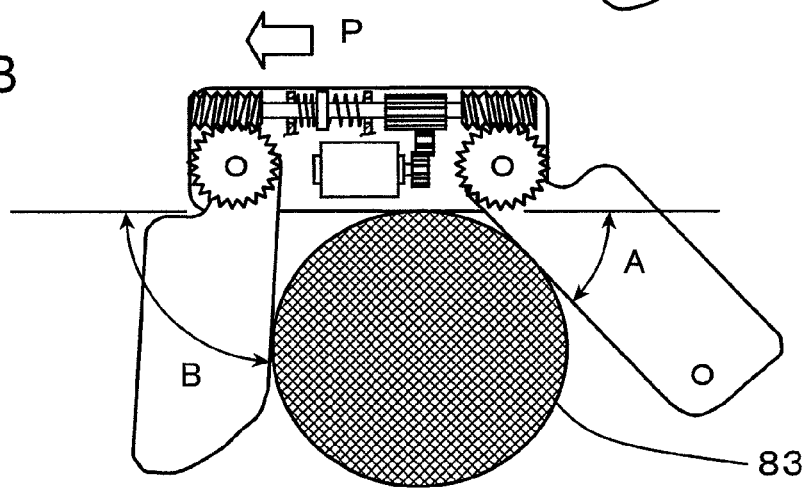
Figure 4C:
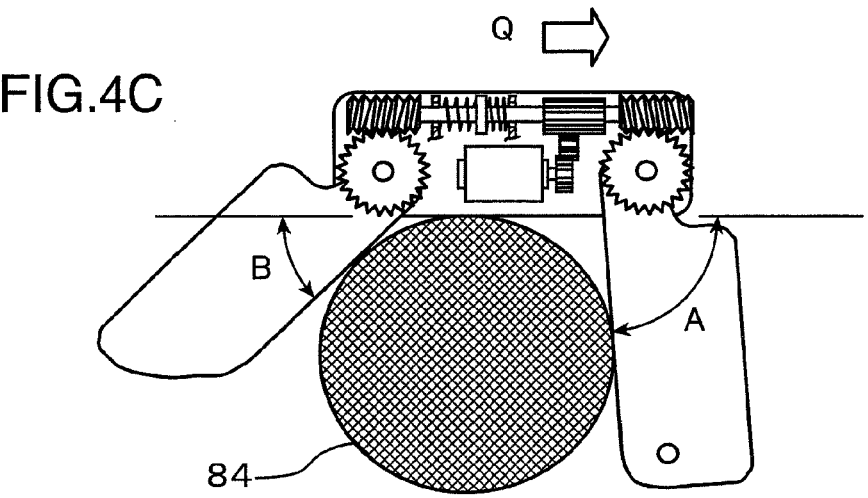

FIGS. 4A through 4C show examples, in the case where smaller-sized articles 83 and 84 are gripped. Similarly to the above case, positional displacement of the article 83, 84 can be eliminated by moving the first link 1 and the third link 3 in association with translational movement of the shaft 11, whereby the gripping mechanism is allowed to perform a gripping operation.

As described above, in the first embodiment, the size difference or the like of the article can be adjusted by rotating the shaft 11 including the worms 9 and 10, and positional displacement of the article can be adjusted by translational movement of the shaft 11. Accordingly, the above arrangement enables to provide a gripping mechanism capable of gripping various kinds of articles different in size or condition.

Specifically, in the first embodiment, if the shaft 11 is rotated in a step prior to a step of gripping an article, the worm wheels 7 and 8 are rotated in opposite directions to each other, and the open angles of the first link 1 and the third link 3 are changed. In other words, since both of the angle "A" and the angle "B" are increased or decreased, a relation: dA×dB≧0 is established. Accordingly, rotating the shaft 11 depending on the size of an article to be gripped enables to adjust the angle "A" and the angle "B" of the first link 1 and the third link 3 so that the article can be securely gripped. Thereby, the article can be gripped in the adjusted state. On the other hand, in the case where forces to be applied from the article to be gripped to the first link 1 and the third link 3 are unbalanced, because of e.g. positional displacement of the article with respect to the first link 1 and the third link 3, torques to be applied to the worms 9 and 10 via the worm wheels 7 and 8 may be unbalanced to each other. As a result, the shaft 11 may be displaced in the axis direction thereof by a distance corresponding to the torque difference between the worms 9 and 10. In this arrangement, the worm wheels 7 and 8 are rotated in identical directions to each other; or one of the worm wheels 7 and 8 whose applied torque is larger is kept unrotated, and the other of the worm wheels 7 and 8 is rotated to eliminate the torque difference by balancing the torques to be applied from the article to the first link 1 and the third link 3. In other words, a relation dA×dB≦0 is established, when the worms 9 and 10 are moved in the axis direction. In moving the worms 9 and 10, the shaft 11 is moved in the axis direction, while shouldering a reaction force at the worm wheels 7 and 8. Thereby, a gripping operation can be smoothly performed, even if the gripping mechanism is positionally displaced with respect to the article. In this way, rotating the shaft 11 depending on the size of an article to be gripped enables to grip various kinds of articles different in size, and eliminate unbalance between the torques to be applied to the first link 1 and the third link 3 resulting from axial movement of the shaft 11, depending on the shape of the article or positional relation of the article with respect to the first link 1 and the third link 3. Accordingly, this arrangement enables to realize a gripping mechanism having degrees of freedom necessary for a gripping operation, with a simplified construction, and capable of gripping an article depending on the shape of the article, without using multiple motors.

In the first embodiment, since a connecting member is constructed by the integrally formed shaft 11, an arrangement capable of obtaining an intended gripping force can be realized with a simplified arrangement.

In the first embodiment, since the worms 9 and 10 have helical grooves in opposite directions to each other, an arrangement of pivotally moving the first link 1 and the third link 3 in opposite directions to each other by rotating the shaft 11 can be realized with a simplified arrangement.

In the first embodiment, since the centering means 20 for restoring the shaft 11 to the neutral position is provided, the directions of the first link 1 and the third link 3 can be stabilized, while a gripping operation is suspended. Further, since the centering means 20 is operable to restore the shaft 11 to the neutral position by resilient forces of the springs 16 and 17, the shaft 11 can be restored to the predetermined position with a simplified arrangement.

In this embodiment, the centering means 20 is provided to maintain a certain shape to be defined by the first link 1 and the third link 3 when the gripping mechanism approaches an article for griping the article. Alternatively, as far as high precision is not required in approaching an article, the centering means 20 may be omitted. The modification is advantageous in reducing the cost.

In this embodiment, the gear 12 is fixed to the shaft 11. Alternatively, the gear 12 may be key-connected to the shaft 11 to allow the gear 12 to move with respect to the shaft 11, while keeping the gear 12 from rotating with respect to the shaft 11. The modification is advantageous in reducing the size of the gear 12, improving the space factor, and avoiding sliding wear on a gear tooth surface. The modification is also advantageous in limiting an area subjected to frictional force to a vicinity of the shaft 11, thereby facilitating translational movement of the shaft 11.

Second Embodiment

In this section, the second embodiment of the invention is described referring to the drawings.

Figure 5A:
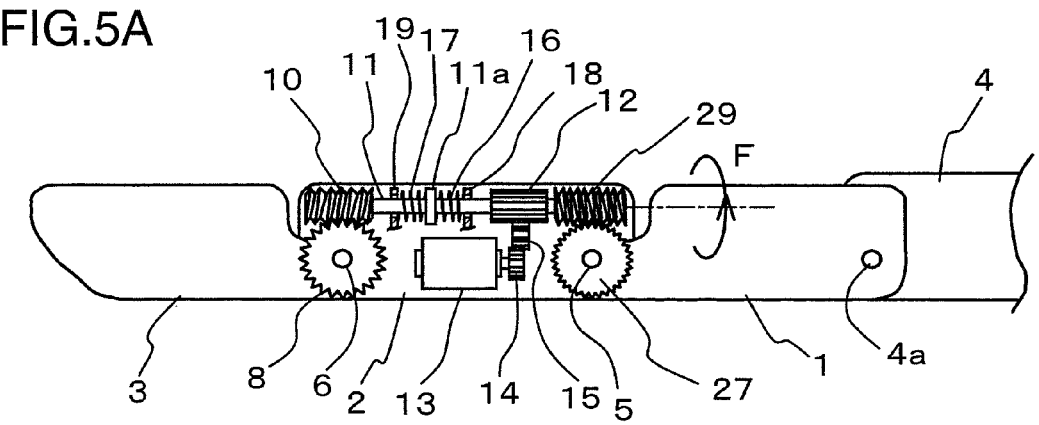
FIGS. 5A through 5C are diagrams showing a construction of a joint mechanism in accordance with the second embodiment of the invention.
Figure 5B:
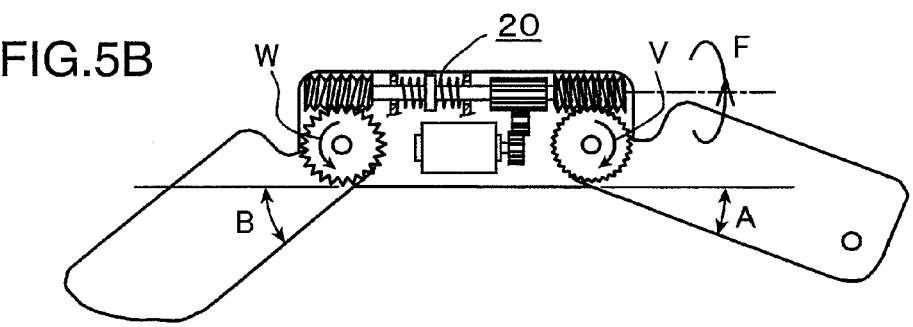
Figure 5C:
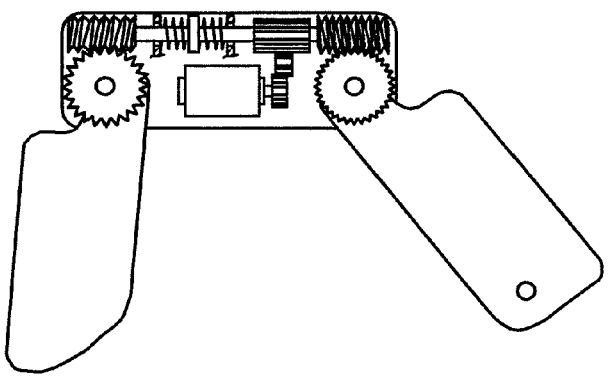

FIGS. 5A through 5C are diagrams showing a joint mechanism in accordance with the second embodiment of the invention. The second embodiment is different from the first embodiment in that a worm wheel 27 and a worm 29 are provided, in place of the worm wheel 7 and the worm 9; but is substantially the same as the first embodiment in other arrangement including the arrangement of the centering means 20.

The worm wheel 27 and the worm 29, and the worm wheel 8 and the worm 10 are the same in diameter, but the worm wheel 27 and the worm 29 are half in module of the worm wheel 8 and the worm 10. Accordingly, the number of teeth of the worm wheel 27 is twice of the number of teeth of the worm 8, and the reduction ratio of a worm gear constituted of the worm wheel 27 and the worm 29 is twice of the reduction ratio of a worm gear constituted of the worm wheel 8 and the worm 10.

Accordingly, a torque between a first link 1 and a second link 2 by rotation of a shaft 11 is twice of a torque between the second link 2 and a third link 3. This arrangement corresponds to a general phenomenon that a moment of force at a base end of a structural member is larger than a moment of force at a distal end thereof, in the case where a load is applied to the structural member.

In the following, an operation of the second embodiment is described. Since a schematic operation including an operation of centering means 20 of the second embodiment is identical to that of the first embodiment, merely a different point of the second embodiment from the first embodiment is described.

As described above, since the reduction ratio of the worm gear at the base end of the joint mechanism is twice of the reduction ratio of the worm gear at the distal end thereof with respect to rotation of the shaft 11, a portion of the link, close to a palm member 4, is capable of receiving a larger moment of force. Accordingly, a load performance of the joint mechanism in performing a gripping operation is increased. In this arrangement, as shown in FIG. 5B, the angle "A" by rotation of the shaft 11 becomes smaller than the angle "B, and unbalance may occur between the first link 1 and the third link 3. However, the unbalance can be eliminated by translational movement of the shaft 11.

As described above, the second embodiment is advantageous in easily eliminating a difference in generated torque, and easily realizing a joint mechanism capable of receiving a proper moment of force suitable for the structure of the joint mechanism.

In this embodiment, the reduction ratio is changed by changing the module size. Alternatively, the reduction ratio may be changed by changing the diameter of the worm wheel.

Third Embodiment

In this section, the third embodiment of the invention is described referring to the drawings.

Figure 6A:
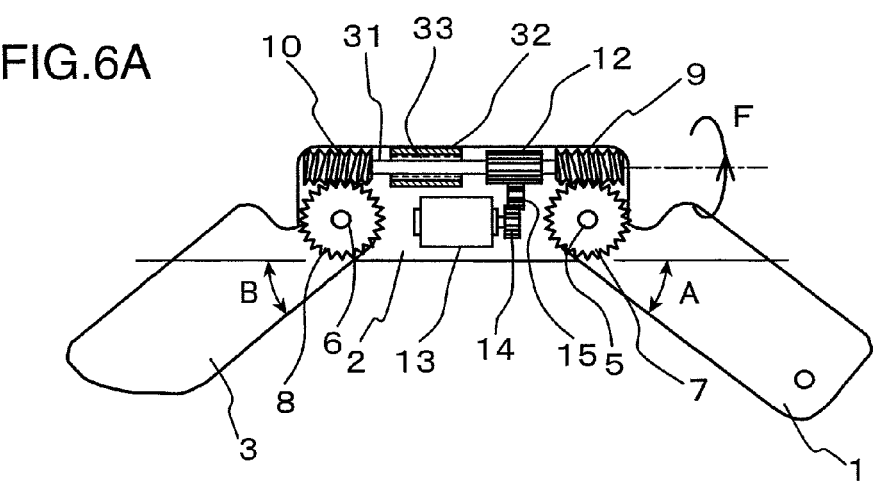
FIGS. 6A through 6C are diagrams showing a construction of a joint mechanism in accordance with the third embodiment of the invention.
Figure 6B:
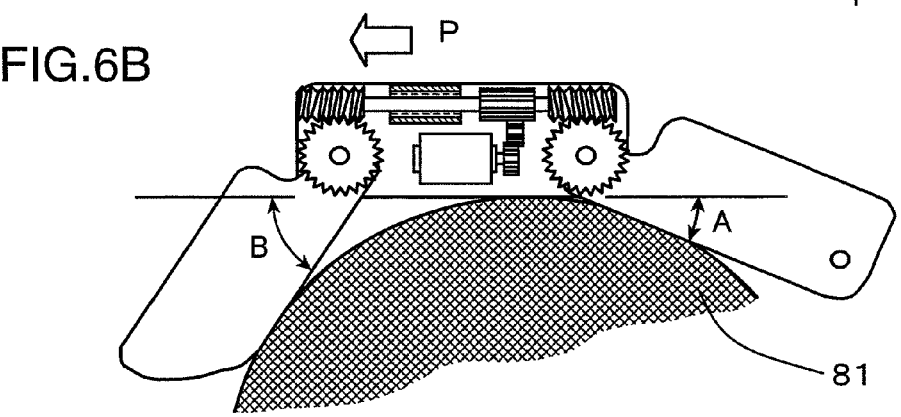
Figure 6C:
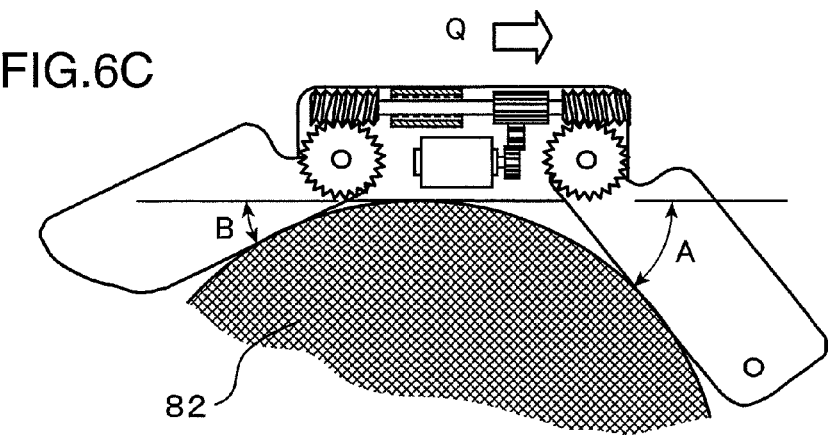

FIGS. 6A through 6C are diagrams showing a construction of a joint mechanism in accordance with the third embodiment of the invention. In the third embodiment, resisting means is provided, in place of the centering means in the first embodiment. In the third embodiment, a flangless shaft 31 is used. The other arrangement in the third embodiment is substantially the same as the corresponding arrangement in the first embodiment.

The resisting means includes a sleeve 32 fixed to a second link 2, and a viscous member 33. The shaft 31 extends through the sleeve 32. The viscous member 33 is filled in a space between the sleeve 32 and the shaft 31. A desirable viscosity of the viscous member 33 is a viscosity capable of moving the shaft 31 at a speed equal to or smaller than about 10 mm/sec by the weight of the shaft 31. The material for the viscous member 33 is preferably a gel material or an oil material having a large viscosity.

The viscous member 33 is a material having a property that a resistance force is generated depending on a relative speed between the shaft 31 and the sleeve 32. The viscous member 33 is operable to keep the shaft 31 from moving at an unduly large relative speed.

An operation of the third embodiment is described merely on a point different from the first embodiment.

The shaft 31 is gradually displaced in the axis direction thereof by the weight thereof, a change in gravitational force, or the like due to the effect of the viscous member 33. Since the shaft 31 is not greatly displaced when the joint mechanism approaches an article for gripping the article, a stable gripping operation can be realized, while suppressing a first link 1 and a third link 3 from abruptly and pivotally moving.

As shown in FIGS. 6B and 6C, similarly to the first embodiment, in gripping an article 81, 82 in a displaced position, the viscous member 33 allows gradual displacement of the shaft 31 in P direction or Q direction, as the first link 1 and the third link 3 are contacted with the article. In the third embodiment, there is no need of generating a force against deformation of a spring.

Fourth Embodiment

In this section, the fourth embodiment of the invention is described referring to the drawings.

Figure 7A:
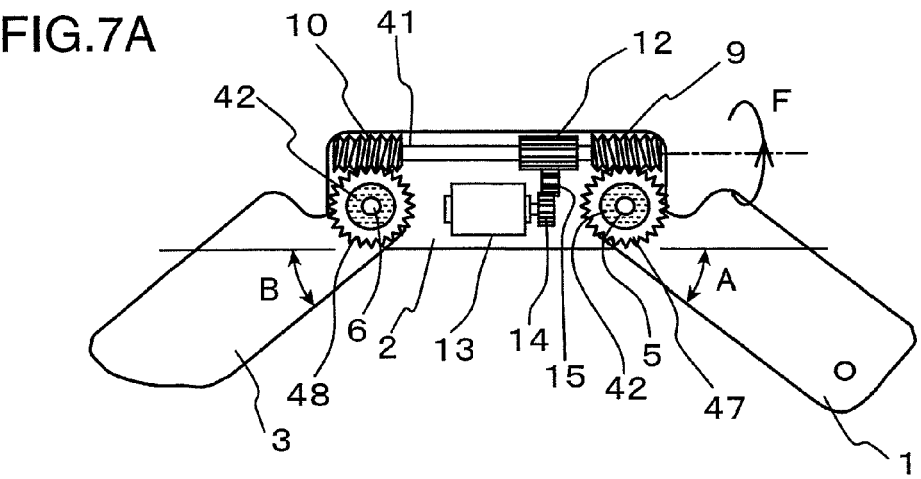
FIGS. 7A through 7C are diagrams showing a construction of a joint mechanism in accordance with the fourth embodiment of the invention.
Figure 7B:
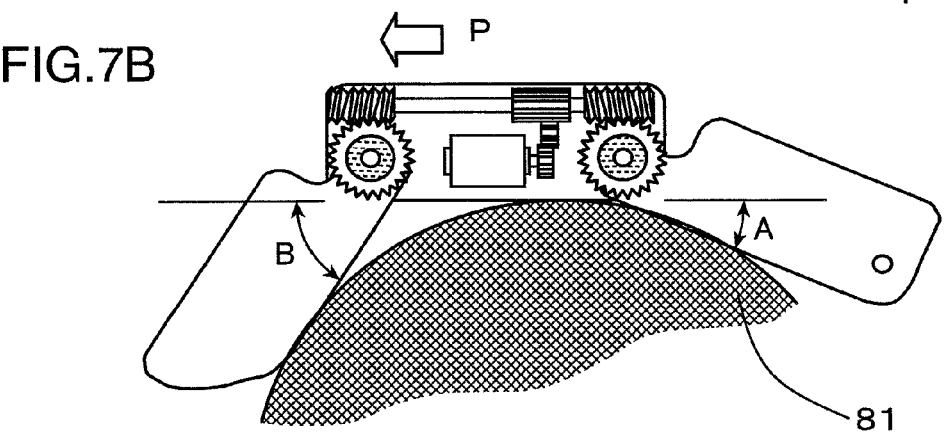
Figure 7C:
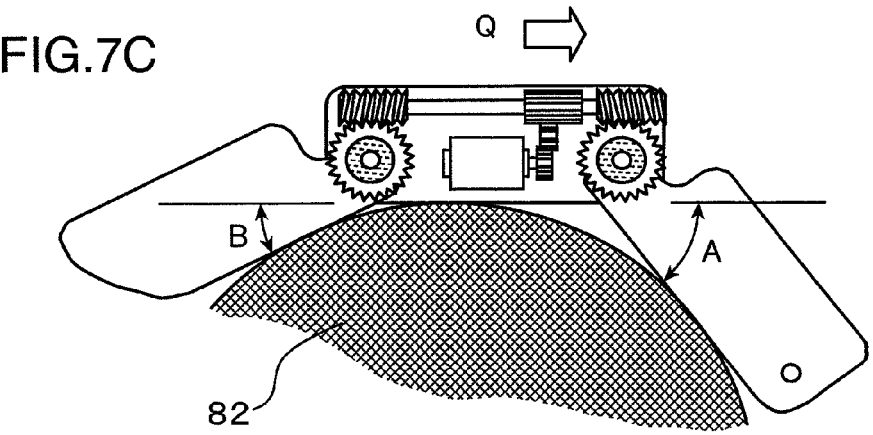

FIGS. 7A through 7C are diagrams showing a construction of a joint mechanism in accordance with the fourth embodiment of the invention. In the fourth embodiment, resisting means is provided, in place of the centering means in the first embodiment. The resisting means in the fourth embodiment is different from the resisting means in the third embodiment. In the fourth embodiment, similarly to the third embodiment, a flangless shaft 41 is used. The other arrangement in the fourth embodiment is substantially the same as the corresponding arrangement in the first embodiment.

The resisting means is constituted of a viscous member 42, which is sealed in a space between a pivot pin 5 and a worm wheel 47, and a space between a pivot pin 6 and a worm wheel 48. The material for the viscous member 33 in the third embodiment may be used as a material for the viscous member 42.

The viscous member 42 is operable to generate a resistance force depending on a relative speed between the pivot pin 5 and the worm wheel 47, and a resistance force depending on a relative speed between the pivot pin 6 and the worm wheel 48. This arrangement enables to prevent a first link 1 and a third link 3 from abruptly and pivotally moving.

The operation of the fourth embodiment is substantially the same as the operation of the third embodiment, as shown in FIGS. 7B and 7C, and the effect of the fourth embodiment is substantially the same as the effect of the third embodiment.

In the fourth embodiment, the viscous member 42 is sealed in the space between the pivot pin 5 and the worm wheel 47, and the space between the pivot pin 6 and the worm wheel 48 to form a speed resistive structure for applying a resistance to the speed. The invention is not limited to the above. Alternatively, a viscous member may be sealed in a space between a second link 2 and the worm wheel 47, and a space between the second link 2 and the worm wheel 48.

In the third and the fourth embodiments, a speed resistive structure by the viscous member is employed. Alternatively, a speed resistive structure by a frictional member may be employed, in place of using the viscous member. The speed resistive structure may be constituted of e.g. an annular resin member. The modification is advantageous in obtaining substantially the same effect as described above.

In the case where a speed resistive function and a restoring force for restoring a normal form are required, the centering means 20 used in the first embodiment may be used in addition to the speed resistive structure.

Fifth Embodiment

In this section, the fifth embodiment of the invention is described referring to the drawings.

FIGS. 8A and 8B, and FIGS. 9A through 9C are diagrams showing a construction of a joint mechanism in accordance with the fifth embodiment of the invention.

Figure 8A:
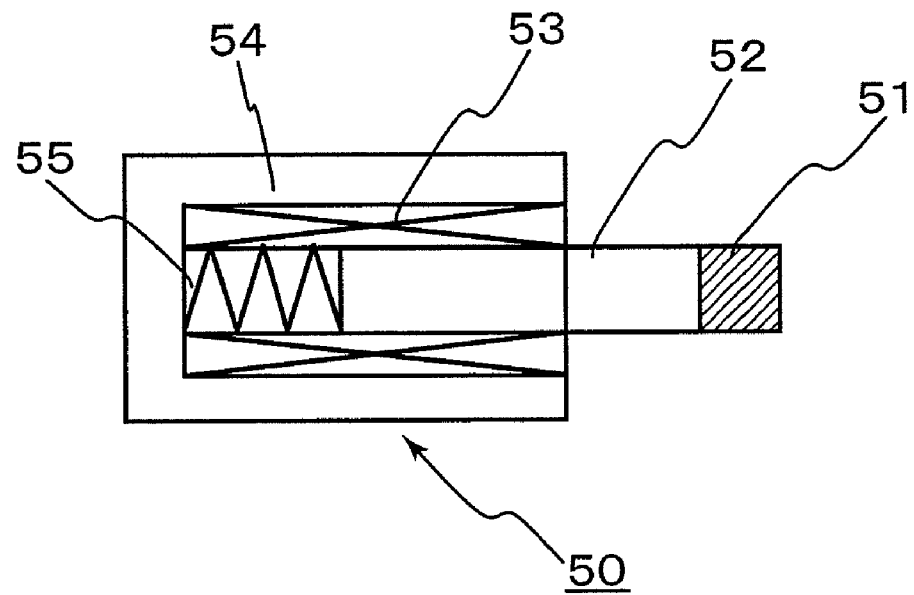
FIGS. 8A and 8B are diagrams showing a construction of a brake mechanism provided in a joint mechanism in accordance with the fifth embodiment of the invention.

FIG. 8A shows a brake mechanism 50 as a braking mechanism. The brake mechanism 50 has a solenoid. Specifically, the brake mechanism 50 includes a magnet 52 made of a magnetic material, a pad 51 constituted of an elastic member such as a rubber, and attached to a distal end of the magnet 52, a bottomed cylindrical yoke 54 made of a magnetic material, a ring-like coil 53 provided in the yoke 54, and a spring 55 wound at the other end of the magnet 52 at a position opposite to the pad 51 and inside the yoke 54.

Figure 8B:
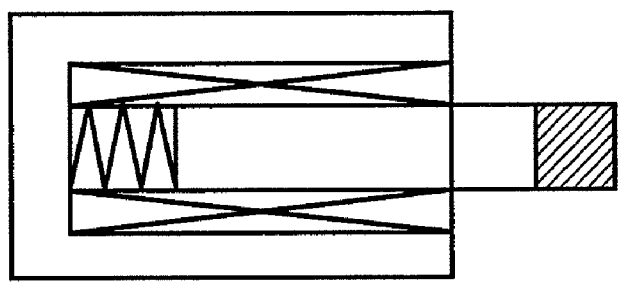

FIG. 8A shows a de-energized state, wherein the spring 55 has a free length. On the other hand, FIG. 8B shows an energized state, wherein a magnetic flux generated around the coil 53 is guided along the yoke 54, and the magnet 52 is attracted inwardly against a resilient force of the spring 55 by a magnetic force.

Figure 9A:
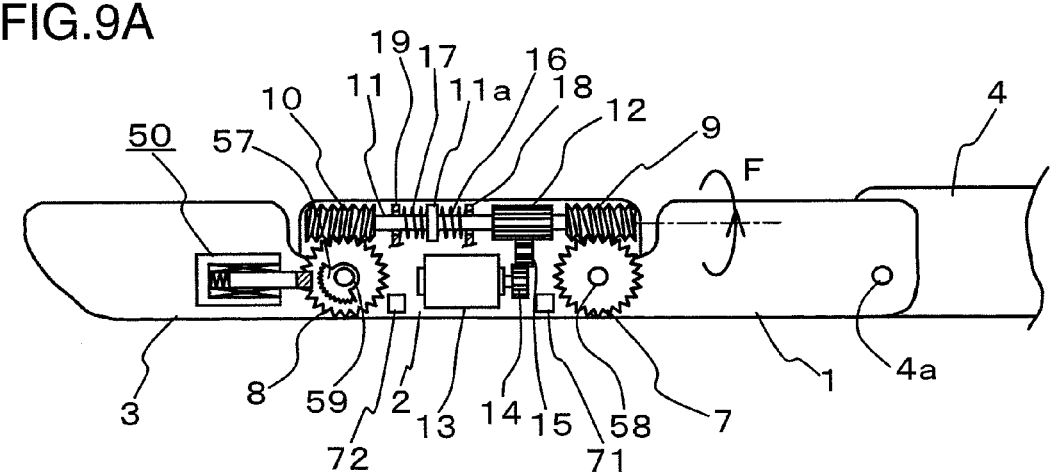
FIGS. 9A through 9C are diagrams showing a construction of the joint mechanism in accordance with the fifth embodiment of the invention.

FIG. 9A shows the entirety of the joint mechanism provided with the brake mechanism 50. The arrangement of the fifth embodiment is substantially the same as the arrangement of the first embodiment except for the brake mechanism 50. The brake mechanism 50 is loaded on a third link 3, and is normally set in an energized state. The reference numerals 58 and 59 in FIG. 9A each indicates a pivot pin. A frictional plate 57 is rigidly fixed to the pivot pin 59 on the third link 3. In other words, the frictional plate 57 is fixed to a second link 2.

The frictional plate 57 has an arc-shaped and rough frictional surface, as opposed to the pad 51. When the brake mechanism 50 is de-energized, the magnet 52 protrudes from the brake mechanism 50, as shown in FIG. 8A. Thereby, the pad 51 is contacted with the rough frictional surface of the frictional plate 57, and a large frictional force is generated between the pad 51 and the frictional plate 57.

Angle sensors 71 and 72 are mounted on the second link 2. The angle sensor 71 is operable to measure the angle "A" of a first link 1 with respect to the second link 2. The angle sensor 72 is operable to measure the angle "B" of the third link 3 with respect to the second link 2. The angle sensors 71 and 72 are connected to an external controller (not shown) for communication of a signal. The controller is operable to control the brake mechanism 50 and a motor 13, based on a signal outputted from the angle sensors 71 and 72.

The other arrangement of the fifth embodiment is substantially the same as the corresponding arrangement of the first embodiment.

An operation to be performed by the joint mechanism having the above arrangement is described in the following.

Figure 9B:
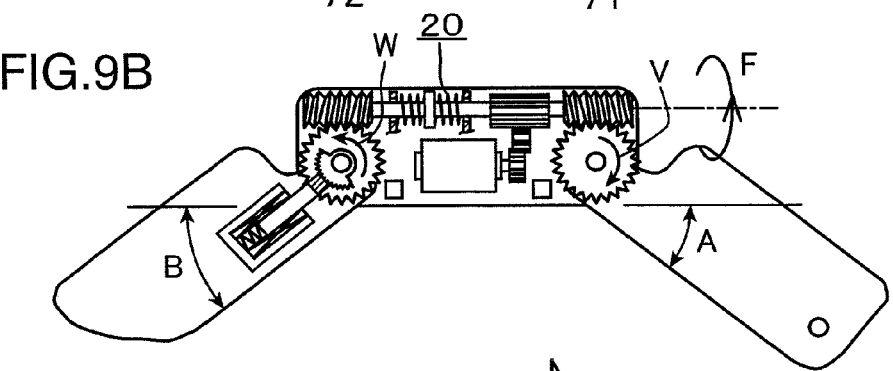
Figure 9C:
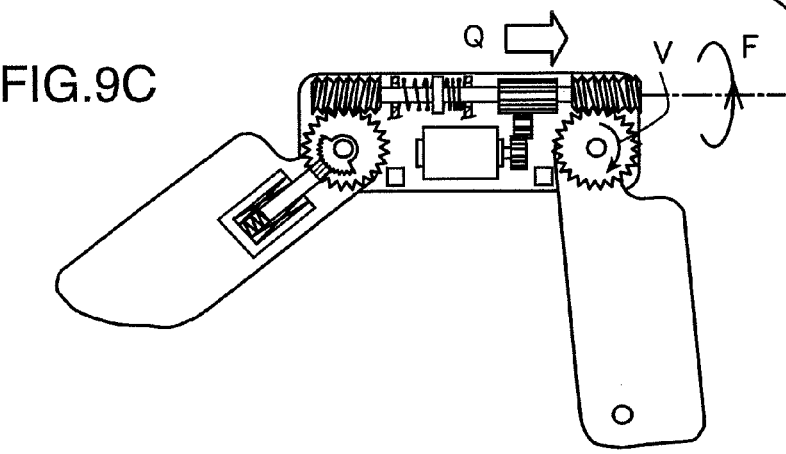

While the joint mechanism is in the states as shown in FIGS. 9A and 9B, since the brake mechanism 50 is energized, the pad 51 is not contacted with the frictional plate 57. Accordingly, similarly to the first embodiment, the first link 1 and the third link 3 are pivotally moved. As shown in FIG. 9B, when the third link 3 is pivotally moved by a predetermined angle, the output of the angle sensor 72 becomes equal to a predetermined value. When the brake mechanism 50 is de-energized in this state, a magnetic field for attracting the magnet 52 is gone. Then, the magnet 52 protrudes from the brake mechanism 50 by the spring 55, and consequently, the pad 51 is contacted with the frictional plate 57. Thereby, the third link 3 is fixed with respect to the second link 2.

Further rotating a shaft 11 in the above state keeps the third link 3 in the state shown in FIG. 9B, because the third link 3 is fixed to the second link 2. On the other hand, the first link 1 is pivotally movable, the first link 1 is pivotally moved in such a direction as to increase the angle "A". Since a worm wheel 8 is not rotated in the above state, the shaft 11 is translationally moved in Q direction in FIG. 9B against a spring force of centering means 20 while rotating by rotation of a worm 10. Then, suspending the motor 13 in the state shown in FIG. 9C by monitoring the output of the angle sensor 71 retains the relative angles between the first through the third links 1 through 3 thereat.

As described above, the fifth embodiment is advantageous in obtaining an intended stationary state of a joint mechanism by providing the brake mechanism 50, and fixing the third link 3 with respect to the second link 2 so that the third link 3 is not pivotally rotated relative to the second link 2. The fifth embodiment is advantageous in gripping various kinds of articles after the joint mechanism is adjusted to an intended stationary state suitable for gripping the articles. In the fifth embodiment, substantially two degrees of freedom are obtained by using a single motor.

In the fifth embodiment, the brake mechanism 50 is provided on the third link 3 to prevent relative movement with respect to the second link 2. Alternatively, the brake mechanism 50 may be mounted on the first link 1, and the frictional plate 57 may be mounted on the pivot pin 58 so that the angle "B" is adjusted after the angle "A" is set. Further alternatively, the brake mechanism 50 may be loaded on both of the first link 1 and the third link 3. In both of the modifications, it is possible to obtain a stationary gripping state.

The shape of the frictional plate 57 and the arrangement of the brake mechanism 50 are not limited to the above. As far as a relative movement between two links can be fixed, various modifications are applicable. Use of a solenoid as an example of the brake mechanism 50 is advantageous because the size of an actuator can be reduced. In the case where frictional fixation is difficult in the aspect of durability, mechanical fixation may be used. For instance, a certain number of pin holes may be formed in the pivot direction, and a pin may be fixedly inserted in a selected one of the pin holes. In the modification, the fixation is discrete fixation.

In this embodiment, the angle sensors 71 and 72 are provided as means for detecting the angles "A" and "B". Alternatively, the angles "A" and "B" may be detected by image measurement using e.g. an external camera.

As described above, in this embodiment, distributing a driving force from a limited number of motors to plural joints, providing a brake mechanism suitable for the joints, and fixing the joints at an intended position enables to provide substantially a change in degree of freedom by using the limited number of motors.

Sixth Embodiment

In this section, the sixth embodiment of the invention is described referring to the drawings.

FIGS. 10A and 10B, and FIGS. 11A through 11C are diagrams showing a construction of a joint mechanism in accordance with the sixth embodiment of the invention. Parts with the same reference numerals as in the first embodiment indicate the same parts as in the first embodiment.

Figure 10A:
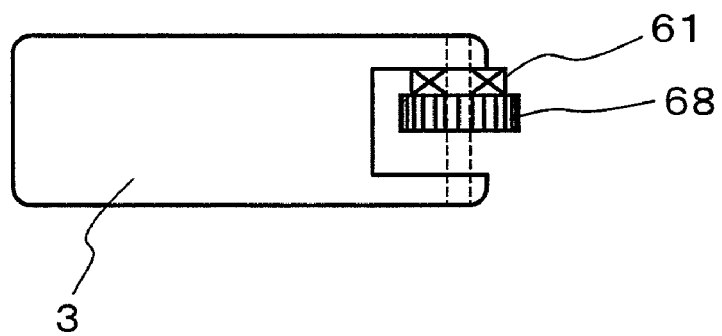
FIGS. 10A and 10B are diagrams showing a clutch mechanism and a third link provided in a joint mechanism in accordance with the sixth embodiment of the invention.
Figure 10B:
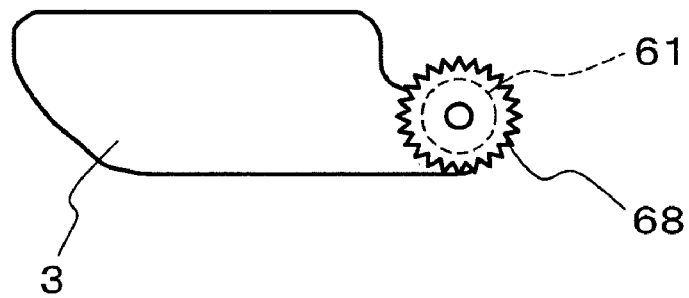

FIGS. 10A and 10B show a third link 3 and parts to be loaded on the third link 3 in the sixth embodiment, wherein FIG. 10B is a side view, and FIG. 10A is a plan view. The reference numeral 61 indicates a clutch mechanism as a clutching mechanism constituted of an electromagnet. The clutch mechanism 61 is fixed to the third link 3, and a pivot pin 6 is mountable in the clutch mechanism 61. Worm wheels 67 and 68 are identical in shape to the worm wheels 7 and 8 in the first embodiment, but are different from the worm wheels 7 and 8 in that the worm wheels 67 and 68 are made of a magnetic material. The worm wheel 68 is different from the worm wheel 8 in the first embodiment in that the worm wheel 68 is not fixed to the third link 3. Angle sensors 71 and 72 are the same as the angle sensors 71 and 72 in the fifth embodiment.

The clutch mechanism 61 is operable to selectively connect and disconnect a transmission path of a driving force from a motor 13 to the third link 3 by switching between a connected state and a disconnected state of the worm wheel 68 with respect to the third link 3. In this embodiment, the clutch mechanism 61 is operable to connect a transmission path of a driving force by a frictional force resulting from a magnetic attraction force. Referring to FIG. 10A, when the clutch mechanism 61 is de-energized, the worm wheel 68 is disengaged from the third link 3, and accordingly, the driving force of the motor 13 is not transmitted to the third link 3. In other words, the worm wheel 68 is freely rotatable with respect to the third link 3. On the other hand, when the clutch mechanism 61 is energized, the worm wheel 68 is magnetically attracted to the clutch mechanism 61, whereby the worm wheel 68 is integrally rotatable with the third link 3.

Similarly to the fourth embodiment, the third link 3 and a second link 2 are viscously linked to each other. The other arrangement of the sixth embodiment is the same as the corresponding arrangement of the first embodiment.

An operation to be performed by the joint mechanism having the above arrangement is described in the following.

Figure 11A:
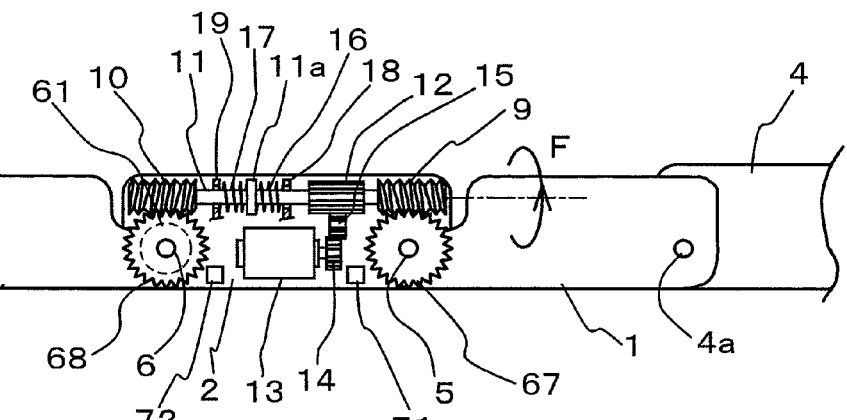
FIGS. 11A through 11C are diagrams showing a construction of the joint mechanism in accordance with the sixth embodiment of the invention.
Figure 11B:
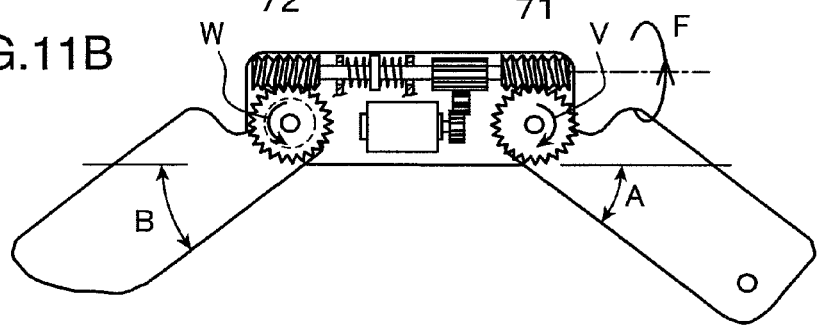
Figure 11C:
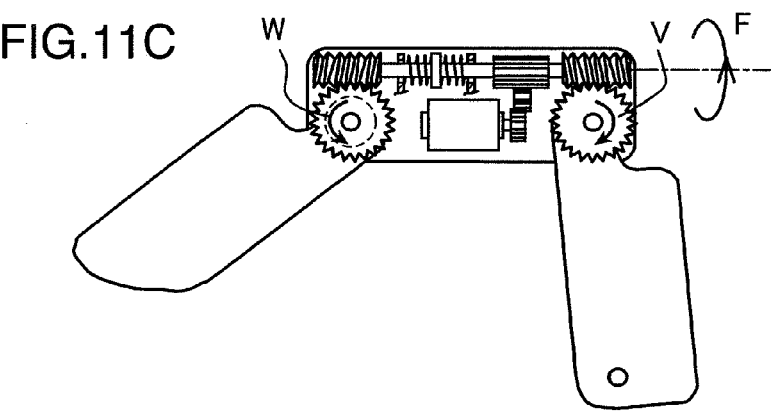

While the joint mechanism is in the states shown in FIGS. 11A and 11B, since the clutch mechanism 61 is energized, the worm wheel 68 is integrally rotatable with the third link 3. Accordingly, similarly to the first embodiment, the first link 1 and the third link 3 are pivotally moved in association with rotation of a shaft 11. Referring to FIG. 11B, when the clutch mechanism 61 is de-energized at a point of time when the output of the angle sensor 72 becomes equal to a predetermined value, the worm wheel 68 is disengaged from the third link 3, and accordingly, the worm wheel 68 is freely rotatable.

When the shaft 11 is further rotated in the above state, solely the worm wheel 68 is freely rotated in W direction, with the third link 3 being unmoved, because the third link 3 is viscously linked to the second link 2, and the worm wheel 68 is freely rotatable. Accordingly, the third link 3 holds the state shown in FIG. 11B. On the other hand, since the first link 1 is pivotally movable in association with rotation of the shaft 11, the first link 1 is pivotally moved in such a direction as to increase the angle "A". When the motor 13 is suspended in the state of FIG. 11C by monitoring the output of e.g. the angle sensor 71, and the clutch mechanism 61 is energized, the relative angles between the first through the third links 1 through 3 are retained thereat.

As described above, the sixth embodiment is advantageous in preventing relative rotation between the third link 3 and the second link 2 by the clutch mechanism 61. Similarly to the fifth embodiment, the sixth embodiment is advantageous in obtaining an intended stationary state of the joint mechanism. The sixth embodiment is advantageous in gripping various kinds of articles, after the joint mechanism is adjusted to an intended stationary state suitable for gripping the articles.

Similarly to the fifth embodiment, the clutch mechanism may be loaded on the first link 1, or loaded on both of the first link 1 and the third link 3.

In the sixth embodiment, the clutch mechanism 61 using an electromagnet is used as a mechanism for connecting the worm wheel 68 and the third link 3. The invention is not limited to the above. As far as a modification does not depart from the scope of the invention, any modification is applicable as necessary.

In the sixth embodiment, similarly to the fifth embodiment, distributing a driving force from a limited number of motors to plural joints, providing a clutch mechanism suitable for the joints, and fixing the joints at an intended position enables to provide substantially a change in degree of freedom by using the limited number of motors.

In the first through the sixth embodiments, the joint mechanisms have been described as examples of a gripping mechanism. The invention is not limited to the above. In other words, the invention may be applicable to a joint mechanism having a purpose of use other than the above, in place of a link mechanism for gripping an article.

Seventh Embodiment

Figure 12:
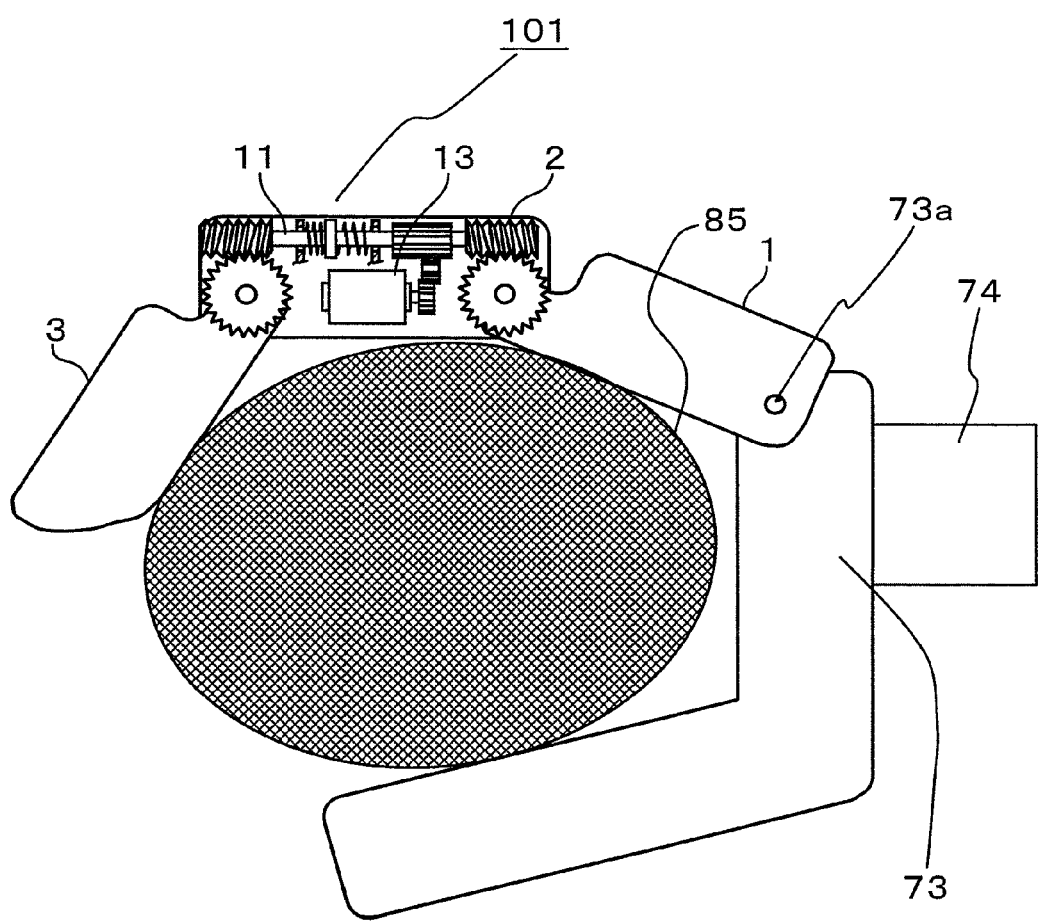
FIG. 12 is a diagram showing a gripping device in accordance with the seventh embodiment of the invention.
Figure 13:
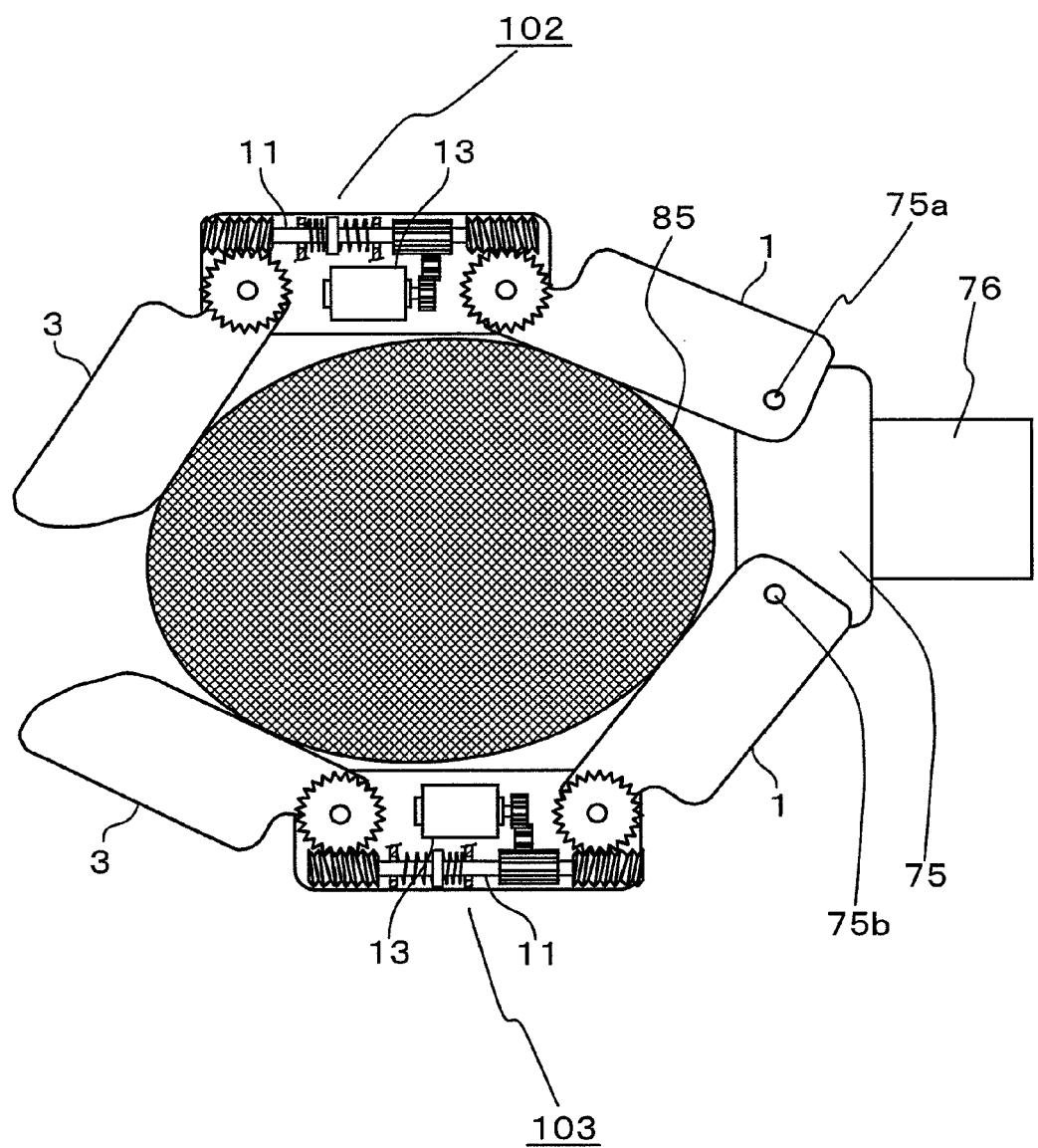
FIG. 13 is a diagram showing a modification of the gripping device in accordance with the seventh embodiment of the invention.

A gripping device operable to grip multitudes of kinds of articles can be easily realized at a low cost by applying the joint mechanisms described in the first through the sixth embodiments, as a gripping finger of a gripping device as an embodiment of a joint device. For instance, FIG. 12 shows an example of a gripping device incorporated with a single joint mechanism. FIG. 13 shows an example of a gripping device incorporated with multiple joint mechanisms.

The gripping device shown in FIG. 12 is a single-fingered gripping device, wherein a palm member is provided as opposed to the gripping finger. A joint mechanism 101 is a joint mechanism constructed as the gripping mechanism described in the first embodiment. A first link 1 of the joint mechanism 101 is connected to a palm member 73 by a pivot pin 73a. The joint mechanism 101 is supported on the palm member 73 as a supporter. The palm member 73 is connected to a wrist member 74. The joint mechanism 101 is pivotally moved about an axis of the pivot pin 73a of the palm member 73 by a motor (not shown) built in the palm member 73. A shaft 11 is rotated about an axis thereof and is displaced in an axis direction thereof by driving a motor 13. Thereby, the first link 1 and a third link 3 are allowed to grip an article 85 along the shape of the article 85. Thus, a gripping operation is performed. Alternatively, the first link 1 and the palm member 73 may be integrally constructed, in place of connecting the first link 1 and the palm member 73 by a pin. In the modification, the integrally formed unit serves as a first link, and the first link is supported on the wrist member 74 serving as a supporter.

FIG. 13 shows a two-fingered gripping device. Joint mechanisms 102 and 103 are respectively a joint mechanism constructed as the gripping mechanism described in the first embodiment. A first link 1 of the joint mechanism 102 is connected to a palm member 75 by a pivot pin 75a, and a first link 1 of the joint mechanism 103 is connected to the palm member 75 by a pivot pin 75b. The palm member 75 is connected to a wrist member 76. Alternatively, the palm member 75 and the wrist member 76 may be integrally constructed. The palm member 75 and the wrist member 76 serve as a supporter. The joint mechanisms 102 and 103 are pivotally moved about axes of the pivot pins 75a and 75b by a motor (not shown) built in the palm member 75. Similarly to the single-fingered gripping device, the first link 1 and a third link 3 are allowed to grip the article 85 along the shape of the article 85 by rotations and axial movements of a shaft 11 in the joint mechanism 102 and a shaft 11 in the joint mechanism 103. Thus, a gripping operation is performed.

Alternatively, the first link 1 of the joint mechanism 102 and the palm member 75 may be integrally constructed. In the modification, the integrally constructed and bent-shaped unit serves as a first link, the first link is supported on the wrist member 76 serving as a supporter, and the first link 1 of the joint mechanism 103 is linked to the first link. Further alternatively, the first link 1 of the joint mechanism 103 and the palm member 75 may be integrally constructed.

Further alternatively, the first link 1 of the joint mechanism 102, the first link 1 of the joint mechanism 103, and the palm member 75 may be integrally constructed. In the modification, the integrally constructed unit serves as a first link, and the first link is supported on the wrist member 76 serving as a supporter. In other words, in this arrangement, the first link is used in common between the two joint mechanisms 102 and 103.

The palm member 75 may be loaded with a mechanism substantially equivalent to a joint mechanism. Further alternatively, any one of the second through the sixth embodiments may be used as a joint mechanism. Further alternatively, a gripping device, wherein joint mechanisms are arranged in parallel to each other, may be constructed. The modification is advantageous in increasing the gripping force. Further alternatively, a robot or a like device incorporated with the gripping device may be realized.

Eighth Embodiment

In this section, the eighth embodiment of the invention is described referring to the drawings.

Figure 14:
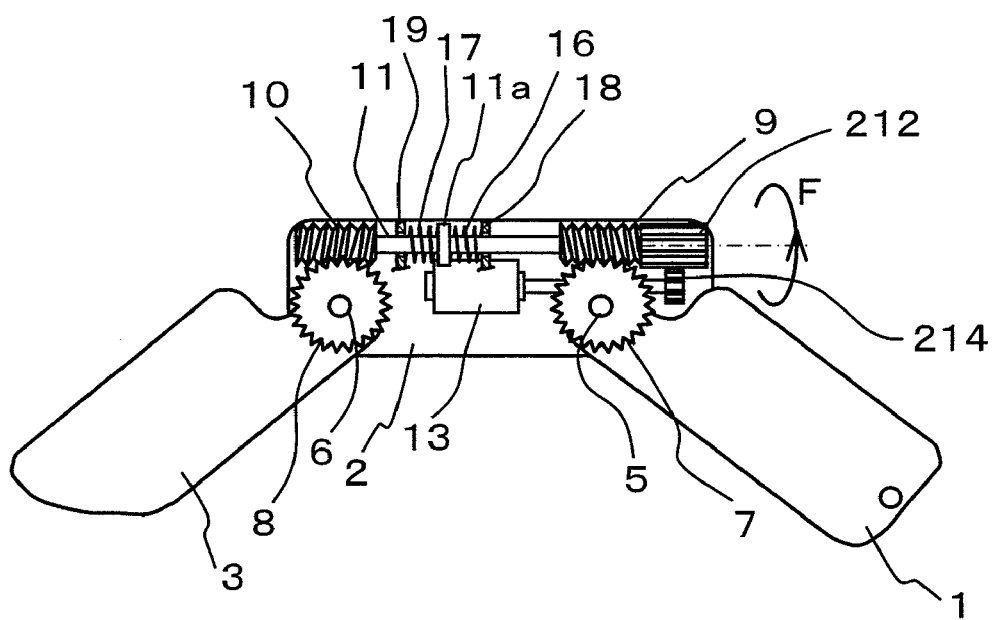
FIG. 14 is a diagram showing a construction of a joint mechanism in accordance with the eighth embodiment of the invention.

FIG. 14 is a diagram showing a construction of a joint mechanism in accordance with the eighth embodiment of the invention. Parts with the same reference numerals as in the first embodiment indicate the same parts as in the first embodiment.

In the eighth embodiment, a gear 212 mounted on a shaft 11 is arranged on the outside of a worm 9. Specifically, whereas in the first embodiment, the gear 12 is mounted between the paired worms 9 and 10 mounted at both ends of the shaft 11, in the eighth embodiment, the worm 9 is disposed at an intermediate portion of the shaft 11, and the gear 212 is disposed on the outside of the worm 9. Accordingly, a worm wheel 7 on a first link 1 is disposed at a position slightly closer to a middle portion of a second link 2, in place of being disposed at one end of the second link 2. In the eighth embodiment having the above arrangement, as compared with the first embodiment, the distance between the worm wheels 7 and 8 can be reduced, and the distance between the first link 1 and a third link 3 can be reduced.

Ninth Embodiment

In this section, the ninth embodiment of the invention is described referring to the drawings.

Figure 15A:
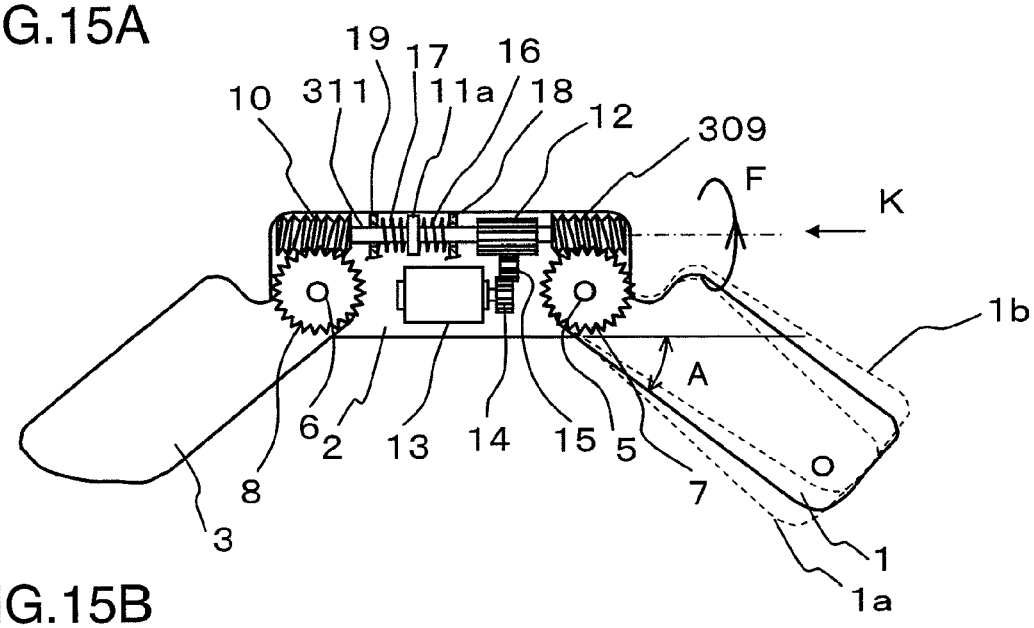
FIG. 15A is a diagram showing a construction of a joint mechanism in accordance with the ninth embodiment of the invention.
Figure 15B:
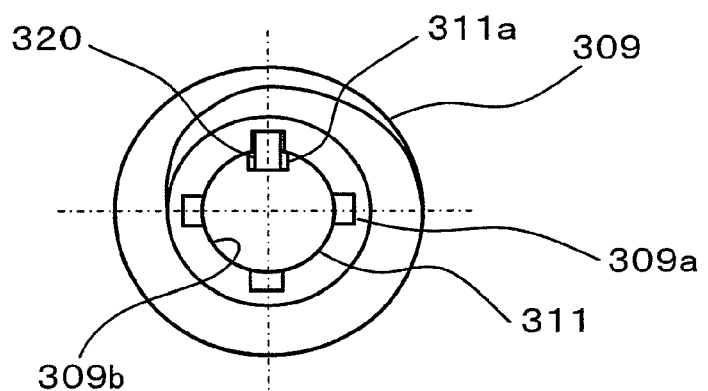
FIG. 15B is a diagram showing fixing means.

FIGS. 15A and 15B are diagrams showing a construction of a joint mechanism in accordance with the ninth embodiment of the invention. Parts with the same reference numerals as in the first embodiment indicate the same parts as in the first embodiment.

In the ninth embodiment, a worm 309 is rotatably mounted on a shaft 311, and fixing means for fixing the worm 309 to the shaft 311 is provided. Similarly to the first embodiment, a worm 10 is fixed to the shaft 311. An example is described in the following.

An insertion hole 309b for receiving the shaft 311 is formed in the worm 309. The shaft 311 is received in the insertion hole 309b. In this arrangement, the worm 309 is rotatable relative to the shaft 311 about an axis of the shaft 311 in a state that the worm 309 is not fixed by a key 320 to be described later.

The fixing means includes a worm groove portion 309a, as a key groove formed in the insertion hole 309b of the worm 309, a shaft groove portion 311a as a key groove formed in the shaft 311, and the key 320 as a fixing member to be inserted in the groove portions 309a and 311a.

The worm groove portion 309a is formed in plural number at a predetermined interval along the circumferential direction of the insertion hole 309b. In the example shown in FIG. 15B, four worm groove portions 309a are equidistantly formed. On the other hand, one shaft groove portion 311*a* is formed in an outer surface at one end of the shaft 311 on the side of the worm 309.

The key 320 is engageable in a space defined by the worm groove portion 309*a* and the shaft groove portion 311*a*. Mounting the key 320 in the space keeps the worm 309 from rotating about the axis of the shaft 311. In other words, the relative angle between the worm 309 and the shaft 311 is fixed.

Mounting the worm 309 to be rotatable relative to the shaft 311 in assembling a first link 1 and a second link 2 makes it possible to freely and pivotally move the first link 1 engaged with the worm 309 about an axis of a pivot pin 5. Accordingly, the open angle "A" of the first link 1 in association with a third link 3 can be finely adjusted. Inserting the key 320 at such a position that one of the worm groove portions 309*a* matches with the shaft groove portion 311*a*, with the open angle "A" closest to a predetermined angle, enables to fix the worm 309. In FIG. 15A, the broken lines 1*a* and 1*b* indicate that the initial position of the first link 1 is changed by changing the worm groove portion 309*a* to be selected. The change amount of the open angle "A" of the first link 1 at the initial position is determined by the pitch of the worm 309, the number of teeth of the worm wheel 7, and the interval of the worm groove portions 309*a*. Accordingly, the number of the worm groove portions 309*a* may be optionally set.

In the ninth embodiment, in mounting the worm 309 on the shaft 311, the worm 309 can be fixed by mounting the worm 309 in a predetermined direction with respect to the shaft 311, and adjusting the open angles of the first link 1 and the third link 3.

Figure 16:
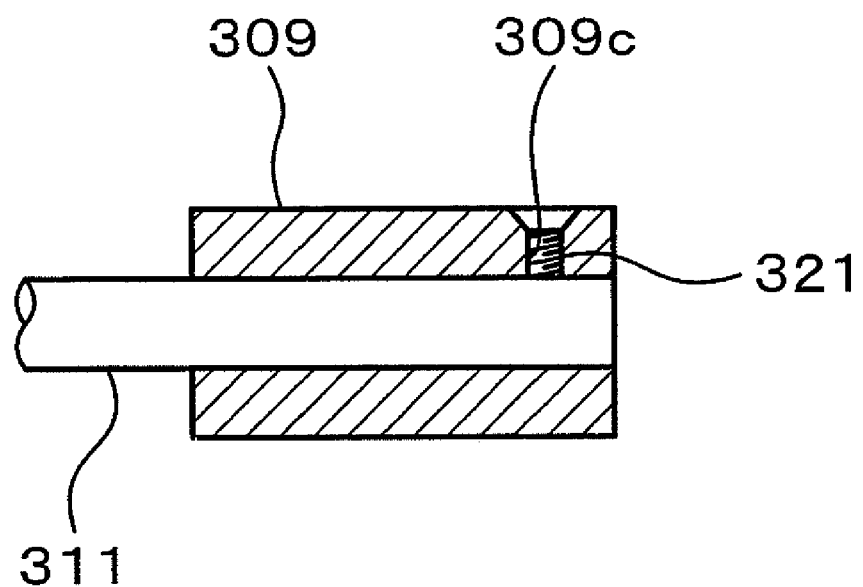
FIG. 16 is a diagram showing a construction of a modification of the joint mechanism in accordance with the ninth embodiment of the invention.

The fixing means is not limited to the arrangement constituted of a key and a key groove. For instance, a worm may be rotatably mounted on a shaft, and the worm may be fixed to the shaft by an adhesive agent. Further alternatively, as shown in FIG. 16, the worm 309 may be fixed to the shaft 311 by radially forming a threaded hole 309*c* through the worm 309, and fastening a screw 321 as a fixing member in the threaded hole 309*c*.

Tenth Embodiment

In this section, the tenth embodiment of the invention is described referring to the drawings.

Figure 17A:
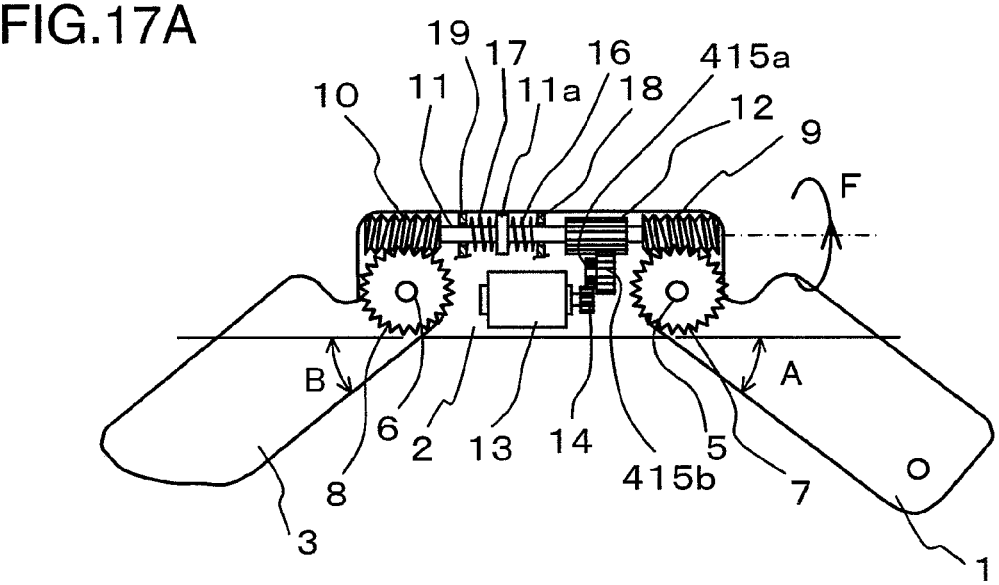
FIG. 17A is a diagram showing a construction of a joint mechanism in accordance with the tenth embodiment of the invention.
Figure 17B:
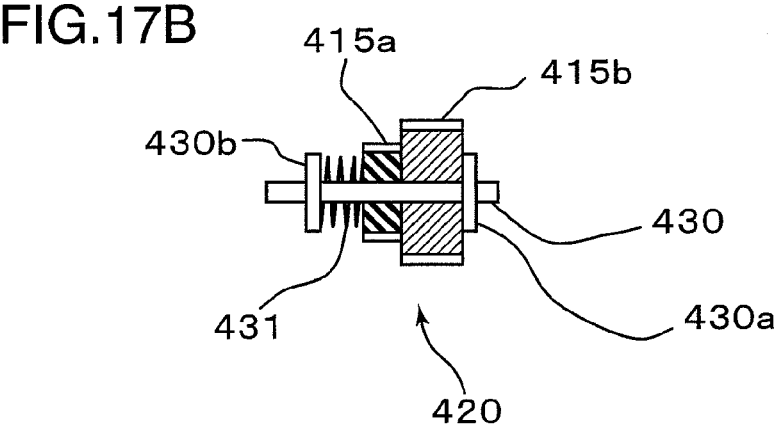
FIG. 17B is a diagram showing a torque limiter.

FIGS. 17A and 17B are diagrams showing a construction of a joint mechanism in accordance with the tenth embodiment of the invention. Parts with the same reference numerals as in the first embodiment indicate the same parts as in the first embodiment.

In the tenth embodiment, a torque limiter 420 for protecting a gear and the like against a rotating torque is provided. The torque limiter 420 is provided in a driving force transmitting system between a motor 13 and a shaft 11. The torque limiter 420 includes a first gear 415*a*, a second gear 415*b*, a spring 431 for urging the first gear 415*a* and the second gear 415*b* in directions toward each other, and flanges 430*a* and 430*b* for absorbing a reaction force of the spring 431. The flanges 430*a* and 430*b* are mounted on a shaft 430 extending through the first gear 415*a* and the second gear 415*b*.

The first gear 415*a* is meshed with a gear 14 mounted on a drive shaft of the motor 13, and the second gear 415*b* is meshed with a gear 12 mounted on the shaft 11. The first gear 415*a* and the second gear 415*b* are coaxially arranged.

The first gear 415*a* and the second gear 415*b* are mounted between the paired flanges 430*a* and 430*b* along with the spring 431 in a compressed state, and are urged toward each other by a resilient force of the spring 431. A friction is caused between the first gear 415*a* and the second gear 415*b*, and a torque to be transmitted by the stationary frictional force is set to such an amount that does not damage a gear or a like element. If a torque larger than a maximum stationary frictional force is generated, a slip is caused between the first gear 415*a* and the second gear 415*b*, and the first gear 415*a* and the second gear 415*b* are rotated relative to each other.

The gear 14 integrally mounted on the output shaft of the motor 13 is meshed with the first gear 415*a*, and a torque is transmitted by frictional contact of the first gear 415*a* and the second gear 415*b*. The torque is then transmitted to the gear 12 mounted on the shaft 11. In the case where rotation of the shaft 11 is suspended resulting from an anomaly operation, a large torque may be exerted on the transmitting system from the motor 13 to the shaft 11. However, since a slip is caused between the first gear 415*a* and the second gear 415*b* with a force equal to or smaller than a limit torque so as not to damage a gear or a like element, there is no likelihood that the gear or the like element may be damaged.

Figure 18:
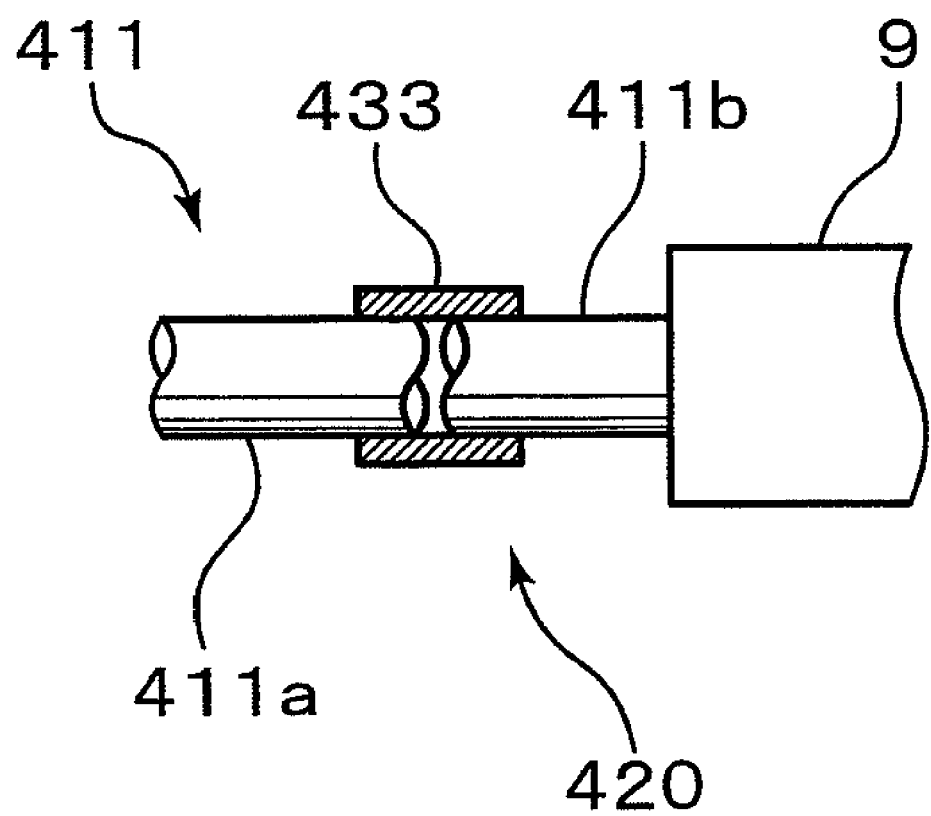
FIG. 18 is a diagram showing a torque limiter to be used in a modification of the tenth embodiment of the invention.

The arrangement of the torque limiter 420 is not limited to the arrangement of cutting off torque transmission between the first gear 415*a* and the second gear 415*b*. For instance, as shown in FIG. 18, the torque limiter 420 may be provided on a shaft 411. Specifically, the shaft 411 is divided into a first shaft portion 411*a* on which a gear 12 is mounted, and a second shaft portion 411*b* on which a worm 9 is mounted, and a connecting portion 433 is bridgingly formed between the first shaft portion 411*a* and the second shaft portion 411*b*. In this arrangement, a torque is transmitted by friction between the connecting portion 433 and the first shaft portion 411*a*, and between the connecting portion 433 and the second shaft portion 411*b*. In the case where a torque equal to or larger than a limit torque is exerted, a slip is caused between the connecting portion 433 and the first shaft portion 411*a*, and between the connecting portion 433 and the second shaft portion 411*b*.

The arrangement of the torque limiter is not limited to the one utilizing friction. For instance, a surface of the first gear 415*a* facing the second gear 415*b* may be formed into a sawtooth shape, and a surface of the second gear 415*b* facing the first gear 415*a* may be formed into a sawtooth shape so that the first gear 415*a* and the second gear 415*b* are meshed with each other. Then, a potential force at which the gear is mounted over the ridge of the sawtooth of the counterpart gear may be set as a limit torque. Similarly to the arrangement utilizing friction, in the above modification, the torque limiter is non-linearly operated with respect to an increase in torque.

Eleventh Embodiment

In this section, the eleventh embodiment of the invention is described referring to the drawings.

FIGS. 19A and 19B are diagrams showing a construction of a joint mechanism in accordance with the eleventh embodiment of the invention. Parts with the same reference numerals as in the first embodiment indicate the same parts as in the first embodiment.

The eleventh embodiment is directed to a joint mechanism functioning as an openable/closable joint of a finger mechanism for a robot hand. A first link of the joint mechanism is a finger mechanism 101 corresponding to a ring finger, a third link of the joint mechanism is a finger mechanism 103 corresponding to an index finger, and a second link of the joint mechanism is a palm mechanism 102 corresponding to a hand palm. The palm mechanism 102 has a first palm portion 102*a*, a second palm portion 102*b*, and a pivot arm 85 and a gear 86 for interconnecting the first palm portion 102*a* and the second palm portion 102*b*. The connecting angle between the first palm portion 102a and the second palm portion 102b is set variable. The first palm portion 102a has a finger mechanism 104a corresponding to a middle finger, and the second palm portion 102b has a finger mechanism 104b corresponding to a thumb.

A motor 113, and support walls 118 and 119 are fixed to the first palm portion 102a of the palm mechanism 102. Springs 116 and 117 are mounted between the support walls and a flange 111a of a shaft 111 is mounted between the springs 116 and 117. The flange 111a, the springs 116 and 117, and the support walls 118 and 119 constitute centering means for worms 109 and 110.

A gear 112 is mounted on the shaft 111. The gear 112 is connected to a gear 114 connected to the motor 113 via a gear 115 so that a driving force of the motor 113 is transmittable to the shaft 111. The finger mechanism 101 is integrally and pivotally movable with a worm gear 107, and the finger mechanism 103 is integrally and pivotally movable with a worm gear 108. In this arrangement, the finger mechanism 101 and the finger mechanism 103 are each operable to change the open angle thereof by driving the motor 113. The open angles of the finger mechanism 101 and the finger mechanism 103 are respectively changeable depending on the shape or the like of an article to be gripped.

A pin support portion 102c for supporting a pivot pin 6 is formed on the first palm portion 102a. A pivot pin 120 for pivotally supporting the finger mechanism 101 in a gripping direction is mounted on the pin support portion 102c. Similarly to the finger mechanism 101, the finger mechanisms 103, 104a, and 104b are each pivotally movable in the gripping direction.

Twelfth Embodiment

In this section, the eleventh embodiment of the invention is described referring to the drawings.

Figure 20A:
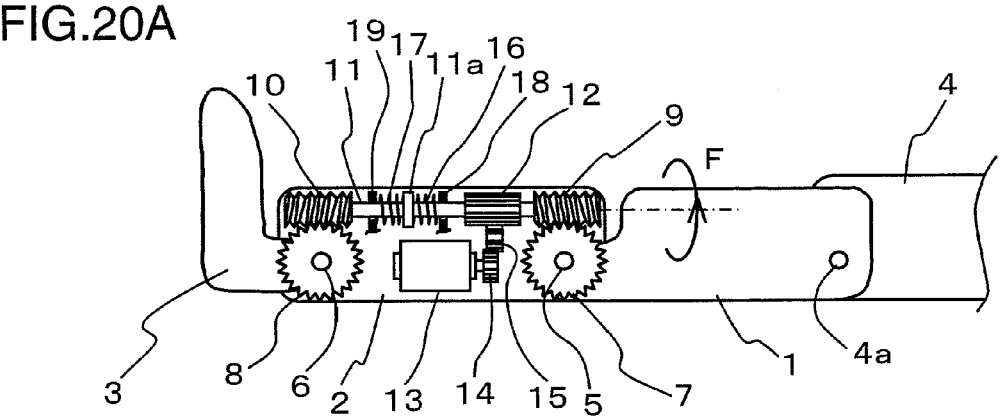
FIGS. 20A through 20C are diagrams showing a construction of a joint mechanism in accordance with the twelfth embodiment of the invention.
Figure 20B:
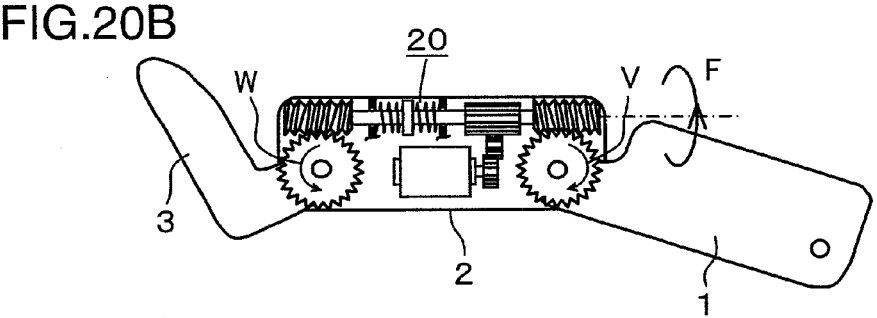
Figure 20C:
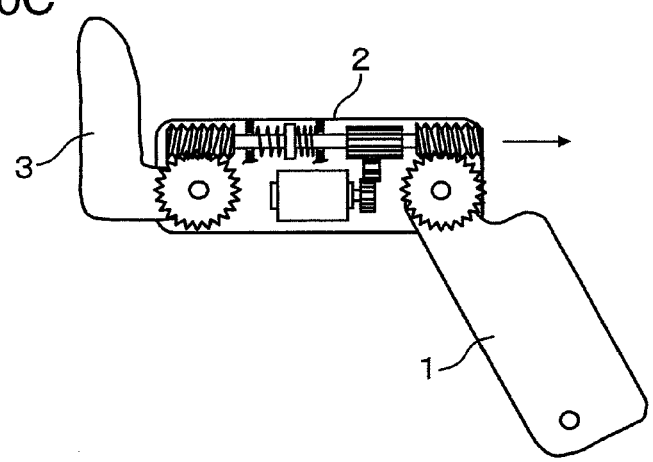
Figure 21:
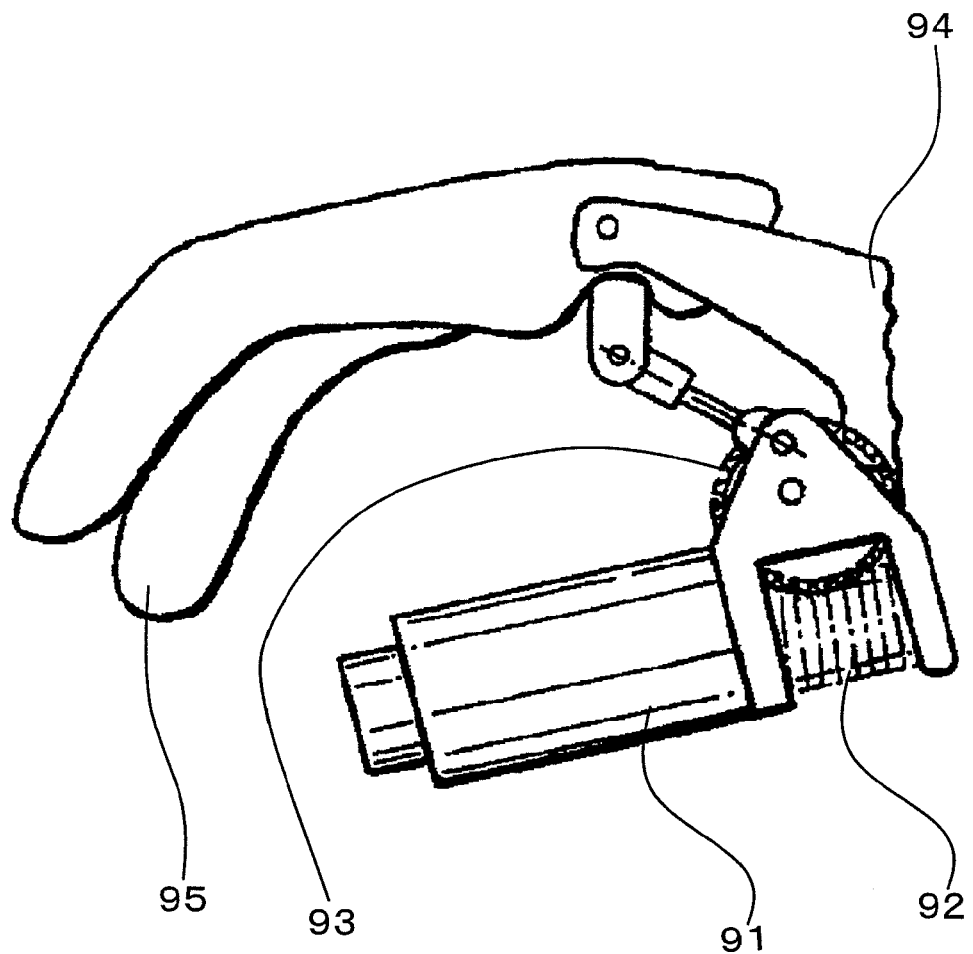
FIG. 21 is a diagram showing a conventional joint mechanism.
Figure 22:
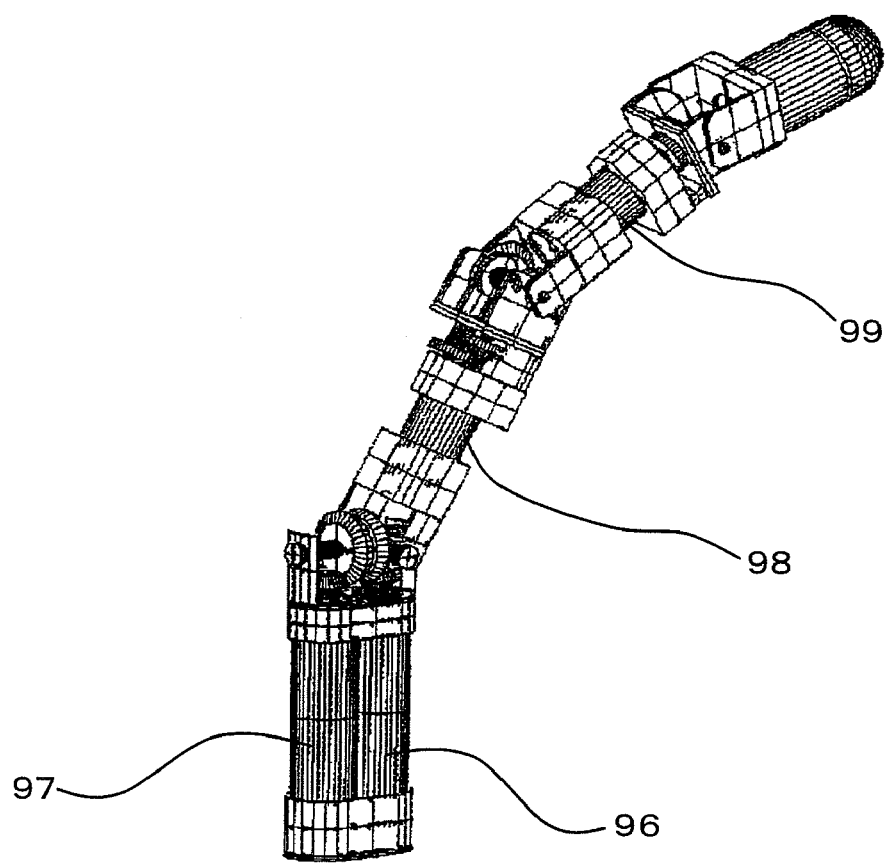
FIG. 22 is a diagram showing another conventional joint mechanism.

FIGS. 20A through 20C are diagrams showing a construction of a joint mechanism in accordance with the twelfth embodiment of the invention. Parts with the same reference numerals as in the first embodiment indicate the same parts as in the first embodiment.

In the first through the sixth embodiments, and the eighth through the tenth embodiments, the joint mechanisms as a gripping mechanism have been described. The twelfth embodiment is directed to a joint mechanism with two joints and adapted to be set in any posture, in place of a joint mechanism for gripping an article. For instance, the joint mechanism of the twelfth embodiment functions as a leg joint of a robot. A third link 3 of the joint mechanism corresponds to a foot of a robot. A first link 1 of the joint mechanism is a link corresponding to e.g. a thigh of a robot. The first link 1 is pin-connected to a member 4 corresponding to an upper body of a robot via a pin 4a. A second link 2 corresponds to e.g. a lower thigh of the robot's leg.

The joint mechanism is operable to change the angle of the first link 1 and the angle of the third link 3 with respect to the second link 2 relative to each other by driving a motor 13. In the case where the third link 3 is contacted with a floor surface, the second link 2 is pivotally moved about an axis of a pivot pin 6, with the third link 3 being kept unmoved. On the other hand, the pivot angle of the first link 1 with respect to the second link 2 is determined by a force to be applied from the upper body member 4. In other words, as described in the first embodiment, if an external force to be applied to the first link 1, and an external force to be applied to the third link 3 are equal to each other, the first link 1 and the third link 3 are rotated, with the shaft 11 being kept unmoved in the axis direction thereof. Accordingly, the pivot angle of the first link 1 with respect to the second link 2, and the pivot angle of the third link 3 with respect to the second link 2 are made equal to each other (see FIG. 20B). On the other hand, if an external force to be applied to the first link 1, and an external force to be applied to the third link 3 are different from each other, the shaft 11 is displaced in the axis direction depending on the force difference, and the pivot angle of the first link 1 with respect to the second link 2, and the pivot angle of the third link 3 with respect to the second link 2 are made different from each other. FIG. 20C shows an example, wherein the force to be applied to the third link 3 is larger than the force to be applied to the first link 1.

In the twelfth embodiment, the relation between the pivot angles of the first link 1 and the third link 3 is determined depending on the magnitudes of forces to be applied to the first link 1 and the third link 3. Accordingly, providing the braking mechanism described in the fifth embodiment, or the clutch mechanism described in the sixth embodiment in the joint mechanism of the twelfth embodiment enables to positively control the pivot angles of the first link 1 and the third link 3. Thereby, the pivot angles of the first link 1 and the third link 3 can be adjusted to an intended angle, and the joint mechanism is easily set in any posture.

Summary of the Embodiments

In this section, a summary of the embodiments is described.

(1) As described above, according to the embodiments, if the two worms are rotated in identical directions to each other while an external force is not applied to the first link and the third link, the two worm wheels are rotated in opposite directions to each other, thereby changing the open angles of the first link and the third link. In other words, both of the angle "A" to be defined by the first link and the second link, and the angle "B" to be defined by the second link and the third link are increased or decreased. As a result, a relation: $dA \times dB \geqq 0$ is established. Accordingly, the angles of the first link and the third link can be adjusted depending on rotations of the first worm and the second worm. On the other hand, in the case where an external force to be applied to the first link and an external force to be applied to the third link are unbalanced, torques to be applied to the two worms via the worm wheels may be unbalanced to each other. As a result, the two worms are displaced in the axis direction by a distance corresponding to the torque difference between the worm wheels. Then, the two worms are integrally displaced in the axis direction in such a manner that the torques to be applied to the first link and the third link are balanced. As a result, the two worm wheels are rotated in identical directions to each other, or one of the worm wheels whose applied torque is larger is kept unrotated and the other of the worm wheels is rotated. In other words, a relation: $dA \times dB \leqq 0$ is established when the worms are moved in the axis direction. In this way, in the embodiments, the open angles of the first link and the third link can be changed depending on rotation amounts of the worms. Further, the connecting member is constructed to be movable in the axis direction. Thereby, the angle of the first link or the third link with respect to the second link can be changed. Thus, the embodiments are advantageous in realizing a joint mechanism settable in any posture with a simplified arrangement.

(2) Preferably, the connecting member may be constituted of an integrally formed shaft.

(3) Preferably, the first worm and the second worm may have helical grooves in opposite directions to each other. In this arrangement, an arrangement of pivotally moving the first link and the third link in opposite directions to each other by rotating the connecting member can be realized with a simplified arrangement.

(4) Preferably, the joint mechanism may further include a motor, fixed to the second link, for rotating the connecting member.

(5) Preferably, the joint mechanism may further include centering means for restoring the connecting member to a predetermined position in an axis direction. In this arrangement, when an external force is not applied to the first link and the third link, the directions of the first link and the third link can be stabilized.

(6) Preferably, in the above arrangement, the centering means may include a resilient member, and the resilient member may be operable to restore the connecting member to the predetermined position by a resilient force of the resilient member. In this arrangement, the connecting member can be restored to the predetermined position with a simplified arrangement.

(7) In the case where the first link is constructed to be connectable to a supporter, preferably, a reduction ratio between the first worm and the first worm wheel may be set larger than a reduction ratio between the second worm and the second worm wheel. The first link serving as a base link to be connected to the supporter receives a larger torque from the worm and the worm wheel. In this arrangement, however, since the reduction ratio of the worm gear at the base link is set larger than the reduction ratio between the worm and the worm wheel at a distal link, the joint mechanism is easily controlled depending on the difference in torque.

(8) Preferably, the joint mechanism may further include resisting means for generating a resistance force depending on a relative moving speed of the connecting member with respect to the second link in the axis direction. This arrangement is advantageous in suppressing the connecting member from abruptly moving in the axis direction resulting from a change in gravitational force, the weight of the connecting member, or the like, depending on the direction of the second link. Thus, the arrangement is advantageous in obtaining a stable operation of the joint mechanism when the joint mechanism approaches an article for gripping the article.

(9) Preferably, the joint mechanism may further include resisting means for generating a resistance force depending on relative rotational speeds of the first worm wheel and the second worm wheel with respect to the second link. This arrangement enables to suppress the first link and the third link from pivotally and abruptly moving.

(10) Preferably, the resisting means may include a viscous member to be provided in a space between the two members subjected to the relative movement.

(11) Preferably, the joint mechanism may further include at least one of a braking mechanism for preventing a change in angle of the first link with respect to the second link, and a braking mechanism for preventing a change in angle of the third link with respect to the second link. In this arrangement, the positions of the first link, the second link, and the third link can be stabilized without a change in angle between the second link, and the first link or the third link. Accordingly, the direction of at least one of the first link and the third link can be defined in advance before the joint mechanism performs a predetermined operation such as an operation of gripping an article. Thus, the arrangement is advantageous in optimally adjusting the posture of the joint mechanism immediately before the joint mechanism performs a predetermined operation.

(12) In the above arrangement, preferably, the joint mechanism may further include an angle sensor for detecting a relative angle between the links, one of which has the braking mechanism, wherein the braking mechanism is operated based on an output of the angle sensor. This arrangement enables to precisely control the angle of the link.

(13) Preferably, the joint mechanism may further include at least one of a clutching mechanism for switching between a connected state and a disconnected state of the first worm wheel with respect to the first link, and a clutching mechanism for switching between a connected state and a disconnected state of the second worm wheel with respect to the third link. In this arrangement, the positions of the first link, the second link, and the third link can be stabilized without a change in angle between the second link, and the first link or the third link. Accordingly, the direction of at least one of the first link and the third link can be defined in advance before the joint mechanism performs a predetermined operation such as an operation of gripping an article. Thus, the arrangement is advantageous in optimally adjusting the posture of the joint mechanism immediately before the joint mechanism performs a predetermined operation.

(14) Preferably, the joint mechanism may further include a clutching mechanism for selectively transmitting a driving force on at least one of a driving force transmission path from the motor to the first link, and a driving force transmission path from the motor to the third link.

(15) Preferably, the joint mechanism may further include an angle sensor for detecting a relative angle between the first link or the third link having the clutching mechanism, and the second link, wherein the clutching mechanism is operated based on an output of the angle sensor.

(16) Preferably, the joint mechanism may further include: multiple gears, between the motor and the connecting member, for transmitting a torque of the motor; and a torque limiter for cutting off transmission of an exceedingly large torque. This arrangement enables to prevent damage of a gear for transmitting a driving force from the motor to the connecting member.

(17) The joint mechanism may be constructed as a gripping mechanism capable of gripping an article. In this arrangement, if the two worms are rotated in identical directions to each other while an external force is not exerted from an article to be gripped on the first link and the third link, the two worm wheels are rotated in opposite directions to each other, thereby changing the open angles of the first link and the third link. In other words, both of the angle "A" and the angle "B" are increased or decreased. As a result, a relation: $dA \times dB \geqq 0$ is established. Accordingly, rotating the connecting member depending on the size of an article to be gripped enables to adjust the angles of the first link and the third link so that the article can be gripped. Thereby, the article can be securely gripped in the adjusted state. On the other hand, in the case where forces to be applied from the article to be gripped to the first link or the third link is unbalanced, because of e.g. positional displacement of the article with respect to the first link and the third link, torques to be applied to the worms via the worm wheels may be unbalanced to each other. As a result, the worms may be displaced in the axis direction thereof by a distance corresponding to a torque difference between the worm wheels. In this arrangement, the worms are integrally displaced in the axis direction so that the torques to be applied from the article to the first link and the third link are balanced. Accordingly, the worm wheels are rotated in identical directions to each other; or one of the worm wheels whose applied torque is larger is kept unrotated, and the other of the worm wheels is rotated. In other words, a relation: $dA \times dB \leqq 0$ is established when the worms are moved in the axis direction. Thereby, a gripping operation can be smoothly performed, even if the article is located in a displaced position. In this way, according to the invention, rotating the connecting member depending on the size of an article to be gripped enables to grip various kinds of articles different in size, and eliminate unbalance between the torques to be applied to the first link and the third link resulting from axial movement of the connecting member, depending on the shape of the article or positional relation of the article with respect to the first link and the third link. Accordingly, this arrangement enables to realize a gripping mechanism having degrees of freedom necessary for a gripping operation, with a simplified construction, and capable of gripping an article depending on the shape of the article, without using multiple motors.

(18) Preferably, at least one of the first worm and the second worm may be rotatably mounted on the shaft, and the joint mechanism may further include fixing means for fixing the rotatable worm at a predetermined angle with respect to the shaft. In this arrangement, the first worm and the second worm can be easily mounted on the shaft in an intended direction in mounting the first worm and the second worm on the shaft.

(19) Another aspect of the invention is directed to a joint mechanism including: a single mechanism drive source; a transmission system including three or more parts, the parts being connected to each other at multiple joints, the transmission system being operable to distribute a driving force from the mechanism drive source to the parts; and a braking mechanism for preventing at least one indirect movement of the joints. In this aspect, since the multiple parts are driven by the single mechanism drive source, the joint mechanism can be produced with a simplified structure and with the degrees of freedom necessary for a gripping operation. Further, the degrees of freedom can be changed depending on an operation of the braking mechanism.

(20) Preferably, the joint mechanism may further include an angle sensor for detecting a relative angle between the parts, wherein the braking mechanism is operated, using a signal based on an output of the angle sensor.

(21) Yet another aspect of the invention is directed to a joint mechanism including: a single mechanism drive source; a transmission system including three or more parts, the parts being connected to each other at multiple joints, the transmission system being operable to distribute a driving force from the mechanism drive source to the parts; and a clutching mechanism for switching between transmission and non-transmission of the driving force to be distributed by the transmission system. In this aspect, since the multiple parts are driven by the single mechanism drive source, the joint mechanism can be produced with a simplified structure and with the degrees of freedom necessary for a gripping operation. Further, the degrees of freedom can be changed depending on an operation of the clutching mechanism.

(22) Preferably, the joint mechanism may further include an angle sensor for detecting a relative angle between the parts, wherein the clutching mechanism is operated, using a signal based on an output of the angle sensor.

(23) Still another aspect of the invention is directed to a joint device including: the aforementioned joint mechanism; and a supporter for supporting the joint mechanism.

As described above, according to the invention, a joint mechanism settable in any posture can be realized with a simplified arrangement.

INDUSTRIAL APPLICABILITY

The joint mechanism according to the invention can be utilized as a gripping mechanism corresponding to a hand finger to be used in a robotic manipulator, and a joint mechanism for a robot.

The invention claimed is:
1. A joint mechanism, comprising:
a first link;
a second link pivotally linked to the first link;
a third link pivotally linked to the second link;
a connecting member supported on the second link, the connecting member being constituted of an integrally formed shaft;
a first worm and a second worm coupled to each other by the connecting member, each of the first worm and the second worm having a respective axis, each of the first worm and the second worm being rotatable about its respective axis, and each of the first worm and the second worm being movable in a direction along its respective axis;
a first worm wheel in mesh with the first worm to pivotally move the first link with respect to the second link;
a second worm wheel in mesh with the second worm to pivotally move the third link with respect to the second link; and
at least one of a first mechanism for preventing the first link from rotating with respect to the second link, and a second mechanism for preventing the first link from rotating with respect to the second link, wherein
the joint mechanism satisfies a relation: $dA \times dB \geqq 0$ by rotation of the first worm and the second worm, and
the joint mechanism satisfies a relation: $dA \times dB \leqq 0$ by movement of the first worm and the second worm in the axis direction,
where A is an angle defined by the first link and the second link, B is an angle defined by the second link and the third link, dA is a change amount of the angle A, and dB is a change amount of the angle B.

2. The joint mechanism according to claim 1, wherein
the first mechanism is comprised of a braking mechanism for preventing a change in angle of the first link with respect to the second link, and
the second mechanism is comprised of a braking mechanism for preventing a change in angle of the third link with respect to the second link.

3. The joint mechanism according to claim 2, further comprising
an angle sensor for detecting a relative angle between the links, one of which has the braking mechanism, wherein
the braking mechanism is operated based on an output of the angle sensor.

4. The joint mechanism according to claim 1, wherein
the first mechanism is comprised of a clutching mechanism for switching between a connected state and a disconnected state of the first worm wheel with respect to the first link, and
the first mechanism is comprised of a clutching mechanism for switching between a connected state and a disconnected state of the second worm wheel with respect to the third link.

5. The joint mechanism according to claim 1, further comprising
a motor, fixed to the second link, for rotating the connecting member, and
a clutching mechanism for selectively transmitting a driving force on at least one of a driving force transmission path from the motor to the first link, and a driving force transmission path from the motor to the third link.

6. The joint mechanism according to claim 4, further comprising
an angle sensor for detecting a relative angle between the first link or the third link having the clutching mechanism, and the second link, wherein
the clutching mechanism is operated based on an output of the angle sensor.

* * * * *